United States Patent
Hattori et al.

(10) Patent No.: US 8,376,814 B2
(45) Date of Patent: Feb. 19, 2013

(54) DEBONING METHOD AND APPARATUS FOR MEAT WITH BONE USING X-RAY

(75) Inventors: Kazuhiro Hattori, Tokyo (JP); Hiroaki Muranami, Tokyo (JP); Tatsuya Umino, Tokyo (JP); Osamu Goto, Tokyo (JP); Kenichiro Kimura, Tokyo (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 13/477,694

(22) Filed: May 22, 2012

(65) Prior Publication Data

US 2012/0295527 A1 Nov. 22, 2012

Related U.S. Application Data

(63) Continuation of application No. PCT/JP2011/068482, filed on Aug. 12, 2011.

(30) Foreign Application Priority Data

Oct. 27, 2010 (JP) ................................. 2010-241309

(51) Int. Cl.
 *A22C 17/00* (2006.01)
(52) U.S. Cl. ...................................................... 452/136
(58) Field of Classification Search .................. 452/136, 452/149, 150, 155–158, 198; 382/100, 110, 382/194, 195, 312, 318
 See application file for complete search history.

(56) References Cited

U.S. PATENT DOCUMENTS

| | | | |
|---|---|---|---|
| 6,277,020 B1 * | 8/2001 | Stephens ........................ | 452/135 |
| 6,299,524 B1 * | 10/2001 | Janssen et al. ................. | 452/198 |
| 7,621,806 B2 * | 11/2009 | Bottemiller et al. ........... | 452/150 |
| 7,850,513 B1 * | 12/2010 | Parker et al. ................... | 454/228 |
| 7,976,368 B2 * | 7/2011 | Haucke et al. ................. | 452/184 |
| 2009/0170417 A1 | 7/2009 | Jansen et al. | |

FOREIGN PATENT DOCUMENTS

| | | |
|---|---|---|
| EP | 2 277 384 A1 | 1/2011 |
| JP | 6-324006 A | 11/1994 |
| JP | 2004-45072 A | 2/2004 |
| JP | 2009-518034 A | 5/2009 |
| WO | 2008136513 A1 | 11/2008 |
| WO | 2009139032 A1 | 11/2009 |

OTHER PUBLICATIONS

International Search Report issued in PCT/JP2011/068482 dated Nov. 29, 2011.

\* cited by examiner

*Primary Examiner* — Richard Price, Jr.
(74) *Attorney, Agent, or Firm* — Rossi, Kimms & McDowell LLP

(57) ABSTRACT

In an automatic deboning apparatus, an X-ray irradiation unit is provided on the upstream side of a meat cutting unit in a direction of transport of the work. In the X-ray irradiation unit, an X-ray r is irradiated to a work w from an X-ray irradiation device, an image of the X-ray transmitted through the work is subjected to image processing in an image analysis process unit, and two-dimensional position coordinates of a bone part are thereby obtained. In the meat cutting unit, three robot arms are provided with cutting blades. A storage unit of a controller stores three-dimensional position coordinates of a target operation course of each of the cutting blades. The target operation course is corrected on the basis of the two-dimensional position coordinates of the bone part obtained for each work in the image analysis process unit.

11 Claims, 25 Drawing Sheets

$W_1 < W_2$ $W_1 > W_2$

VIEW TAKEN ALONG ARROWS X-X

VIEW TAKEN ALONG ARROWS Y-Y

FIG. 22A
| LOWER LEG BONE | THIGH BONE | TOTAL |
|---|---|---|
| 10.2g | 24.17g | 34.37g |
FIG. 22B
| LOWER LEG BONE | THIGH BONE | TOTAL |
|---|---|---|
| 19.4g | 40.7g | 58.8g |
FIG. 23A
FIG. 23B
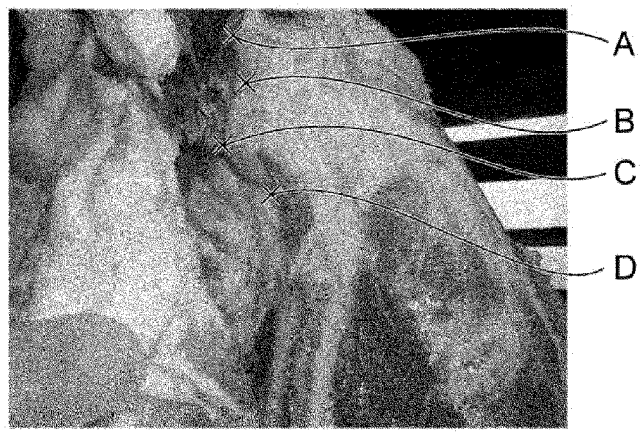

FIG. 29
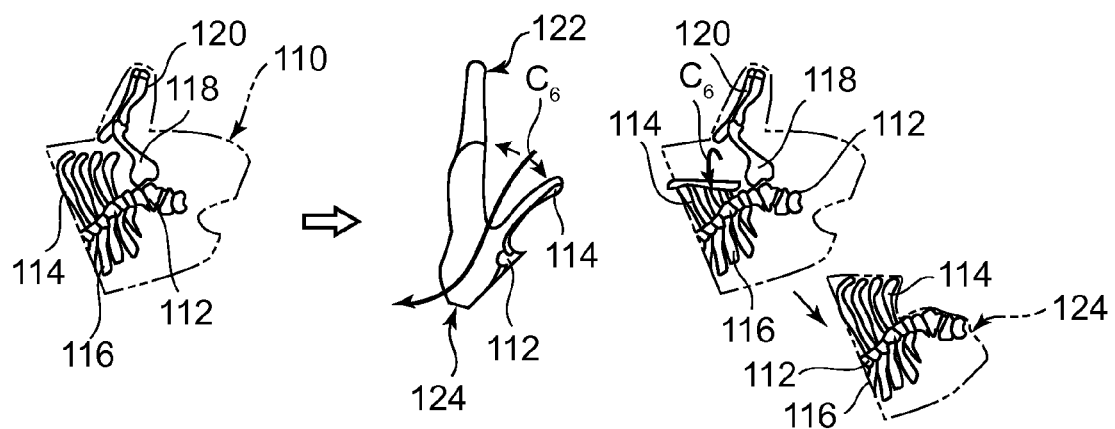
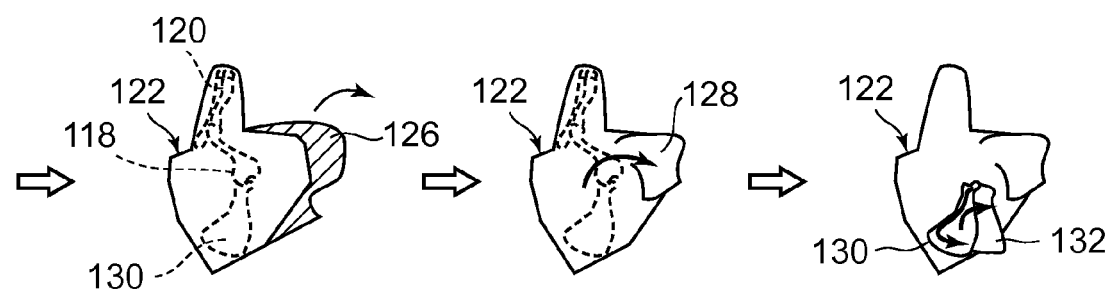

DEBONING METHOD AND APPARATUS FOR MEAT WITH BONE USING X-RAY

TECHNICAL FIELD

The present invention relates to a deboning method and a deboning apparatus that exhibit excellent yield and can avert damage to a cutting blade or the like by precisely grasping the outline of a bone by using an X-ray in the step of separating meat from the bone of an arm part or a thigh part of a carcass to be supplied as meat.

BACKGROUND ART

The step of deboning an arm part or a thigh part (hereinafter referred to as a "work") of a carcass to be supplied as meat such as pork, beef, and mutton roughly consists of a preliminary step of removing a hip bone and the like, a meat cutting step of making a cut in a longitudinal direction along the surface of a forearm bone, a humerus, a lower leg bone, or a thigh bone, and a meat separation step of tearing meat after the meat cutting step. Because the work is heavy, when the dissection and deboning operation is manually performed, heavy work is required. As a result, an operator has performed the deboning process while the work has been suspended by a suspension device such as a gambrel or a clamping device and transported, the heavy work has been still required.

Consequently, the present inventors propose a deboning unit in which the steps other than the preliminary step are automated in each of Patent Document 1 (WO 2008/136513A1) and Patent Document 2 (WO 2009/139032A1).

In the meat cutting step of the automated unit, when a bone buried in the meat of a work is removed while the work is suspended by the suspension device via an ankle, the total length of the bone of the work is measured with a clamping position by the suspension device used as a starting point. From the information on the total length, the outline of the buried bone is presumed based on an empirical rule. Next, a robot arm equipped with a cutting blade is operated to move the cutting blade along the presumed outline of the bone, and the meat cutting is thereby performed.

Although the method can handle about 80% of the total number of works, since the size of the work has an individual difference, in some cases, the bone has been left in the meat and the yield has been thereby reduced in the remaining 20% thereof. In addition, in some cases, the cutting blade has cut into the bone, an excessive load has been applied to the cutting blade, and the cutting blade has been damaged so that the deboning apparatus has had to be halted. The arm part and the thigh part of the carcass have many uneven variation points at its joint part and condyle part, and it is not easy to precisely operate the cutting blade along the surface of the bone at these parts when the individual difference in the work is large.

In the deboning step, although it is necessary to precisely cut body tissues such as a muscle and a tendon around the bone, a complicated arc-like shape of the bone completely buried in meat is not visible from the outside. In addition, due to a seasonal change in the state of fleshing or different states of fleshing of different farms, the size of the work itself varies so that there are cases where the muscle or the tendon cannot be cut completely in some works. Further, the above-described excessive load is applied to the cutting blade during the meat cutting in some movements of the robot arm, and hence the cutting blade has been operated on a safe side in which consideration has been given to an error resulting from the individual difference such that the excessive load has not been generated. As a result, in some cases, the yield of meat has been reduced.

Patent Document 3 discloses (Japanese Patent Application Laid-open No. H6-324006) a technical matter in which positions of a muscle of meat, a tendon, and a bone are read by using an X-ray irradiation unit, the positions thereof are indicated on two or more dimensional coordinates, and a cutting section is caused to perform a cutting operation on the basis of the process data.

[Patent Document 1] WO 2008/136513A1
[Patent Document 2] WO 2009/139032A1
[Patent Document 3] Japanese Patent Application Laid-open No. H6-324006

The technical matter disclosed in Patent Document 3 presents only the idea in which the positions of the muscle of the meat, the tendon, and the bone are read by using the X-ray irradiation unit and the result of the reading is utilized for the cutting of the muscle of the meat or the separation of the bone. Accordingly, even when the technical matter disclosed in Patent Document 3 is applied to the automated deboning unit disclosed in Patent Document 1 or 2, the above-described problem cannot be solved. That is, in order to allow a deboning process that does not generate the excessive load to the cutting blade, does not reduce operation efficiency, and maintains high yield to be performed on the work that has the complicated shape, is suspended, and rapidly moves at a constant speed or by feed based on a tact system, there are still many problems in terms of a production technology.

DISCLOSURE OF THE INVENTION

In view of the problems of the conventional art, an object of the present invention is to generate no excessive load to a cutting blade, reduce damage to the cutting blade or the like to maintain high operation efficiency, and improve yield to be higher than that of the conventional automated unit in an automatic deboning step of a work.

In order to achieve the object, a deboning method for meat with bone using an X-ray of the present invention is a method in which, in a state where an arm part or a thigh part of a carcass is suspended via an ankle, a deboning process of the arm part or the thigh part is performed by using a multi-axis articulated arm provided with a cutting blade that operates based on a predetermined operation course including a preliminary step of setting a comparison reference point on an outline of a bone of the arm part or the thigh part, and also presetting three-dimensional position coordinates of a target operation course of the cutting blade and two-dimensional position coordinates of the comparison reference point corresponding to the three-dimensional position coordinates of the target operation course, an X-ray image analysis step of irradiating the X-ray to each arm part or each thigh part to obtain two-dimensional position coordinates of the outline of the bone of the arm part or the thigh part by analyzing a transmitted X-ray image, an operation course correction step of determining a positional displacement amount between the two-dimensional position coordinates of the comparison reference point corresponding to the target operation course and the two-dimensional position coordinates of the comparison reference point obtained in the X-ray image analysis step to determine a corrected operation course obtained by correcting the target operation course correspondingly to the positional displacement amount, and a cutting blade operation step of operating the cutting blade on the corrected operation course determined in the operation course correction step to perform meat cutting or meat separation of the arm part or the thigh part.

In the method of the present invention, one or more comparison reference points are set at positions that can be easily located on the outlines of the bones of the work. In addition, the three-dimensional position coordinates of the target operation course and the two-dimensional position coordinates of the comparison reference point corresponding to the target operation course are preset. The positional displacement amount between the two-dimensional position coordinates and the two-dimensional position coordinates of the comparison reference point obtained in the X-ray image analysis step is determined, and the target operation course is corrected correspondingly to the positional displacement amount. By performing this process on each work, it is possible to precisely operate the cutting blade along the outline of the bone of each work. As a result, it is possible to prevent the cutting blade from cutting into the bone, reduce damage to the cutting blade to maintain high operation efficiency, and improve yield.

Thus, according to the method of the present invention, it is possible to precisely detect the shape of the bone inside meat, especially the complicated shape and the position of a knee part or a condyle part for each work by analyzing the X-ray image, and hence it is possible to allow the deboning process having high accuracy as compared with the conventional process method in which the shape of the bone is presumed according to an empirical rule. With this, it is possible to improve the yield of meat, avert the cutting of the bone, and prevent a foreign object such as a bone fragment or the like from mixing into the meat. In addition, it is possible to avert the generation of an excessive load in the cutting blade, and hence it is possible to reduce the capacity and power of a drive device of the cutting blade.

The method of the present invention preferably further includes an ankle measurement step of determining an ankle bone diameter $W_1$ immediately below a clamping position of an ankle of the arm part or the thigh part and an ankle bone diameter $W_2$ immediately above the clamping position thereof from the two-dimensional position coordinates of the outline of the bone of the arm part or the thigh part obtained in the X-ray image analysis step, a work length measurement step of determining a length $L_1$ from the clamping position to a joint and a length $L_2$ from the joint to an end of a condyle from the two-dimensional position coordinates obtained in the X-ray image analysis step when the ankle bone diameter $W_1$ is larger than the ankle bone diameter $W_2$ in the ankle measurement step, and an image information correction step of changing, when a ratio between the length $L_1$ and the length $L_2$ is not a normal value, the ratio between the lengths to the normal value to correct the two-dimensional position coordinates obtained in the X-ray image analysis step.

The ankle part has a part having an extremely small cross-sectional bone diameter in the central part of a lower leg bone, and a part in the vicinity of the extremely small diameter part is clamped and suspended by a suspension device. At this point, the work usually descends by its own weight, and the work is fixed to the suspension device with the clamping position at an increased diameter part closer to the tip than the extremely small diameter part. As a result, all works can be suspended at a substantially constant height from the tip of the ankle of each work. The X-ray image analysis is performed with the work suspended at this position, and the operation course of the cutting blade is set on the basis of two-dimensional position information on the outline of the bone obtained in the X-ray image analysis.

However, when the ankle is clamped at a position satisfying $W_1 > W_2$, in some cases, the work does not descend to the increased diameter part. When the work is subjected to the X-ray image analysis in this state, and the work descends to the normal clamping position with the load by the cutting blade applied to the work in the subsequent deboning step, a situation occurs in which the operation course of the cutting blade does not match the actual position of the work and the excessive load is applied to the cutting blade. To cope with this, by performing the ankle measurement step, the image information correction step, and the image information correction step, even when the clamping position of the work is abnormal, it is possible to match the operation course of the cutting blade with the actual outline of the bone of the work.

In the method of the present invention, it is preferable that, in the preliminary step, a reaction force applied to the cutting blade when the cutting blade operates on the target operation course is measured in advance and target reaction force data is stored, in the cutting blade operation step, the meat cutting in which a cut is made in a longitudinal direction along a surface of the bone of the arm part or the thigh part is performed and a reaction force applied to the cutting blade during a cutting operation is measured, and, when a difference between the measured reaction force and the target reaction force data is out of a set range, the corrected operation course corrected in the operation course correction step is changed such that the difference falls within the set range. For example, when the measured reaction force is higher than the upper limit of a threshold value, the cutting blade is moved in a direction in which the cutting blade is moved away from the bone, and the measured reaction force is thereby returned to a value not more than the threshold value. On the other hand, when the measured reaction force is lower than the threshold value, the cutting blade is moved close to the bone, and the measured reaction force is thereby returned within the threshold value.

Thus, by measuring the reaction force applied to the cutting blade, it is possible to operate the cutting blade along the surface of the bone more precisely. As a result, it is possible to further improve the yield of meat, avert the excessive load applied to the cutting blade, and avert the breakage of the blade and the cutting of the bone.

Note that the reaction force applied to the cutting blade cab be determined by detecting the current value or the voltage value of an electric motor that drives the cutting blade. Alternatively, by providing the cutting blade or the like with a strain gauge, and the reaction force can be determined from the value of the strain gauge. In addition, by subtracting reaction force data measured during a no-load operation from reaction force data measured during a loaded operation, it is possible to determine the precise reaction force that is not influenced by gravity applied to the cutting blade or a fluctuation in bending moment resulting from gravity.

In the method of the present invention, it is preferable that a check point is set at a position where an excessive load tends to be generated in the cutting blade on the operation course of the cutting blade, the reaction force applied to the cutting blade during the cutting operation is measured in a region on an upstream side of the check point, and, when the difference between the measured reaction force and the target reaction force data is out of the set range, the corrected operation course from a point, where the reaction force is measured, to the checkpoint is changed such that the difference falls within the set range. The checkpoint is set at the joint part or the condyle part where many uneven variation points are present. With this, it is possible to prevent the generation of the excessive load in the cutting blade at the joint part or the condyle part where many uneven variation points are present beforehand, and prevent the cutting of the cutting blade into the bone, the damage to the cutting blade, and the cutting of the bone.

In the method of the present invention, it is preferable that a reaction force applied to the cutting blade during a no-load operation is measured in advance and no-load reaction force data is stored in the preliminary step, the reaction force applied to the cutting blade during the cutting operation of the cutting blade and the no-load reaction force data are compared with each other and, when a difference between the reaction force and the no-load reaction force data is out of a set range, it is determined that the cutting blade is damaged and an operation is halted. With this, it is possible to speedily detect the damage to the cutting blade to halt the operation of the deboning apparatus. Note that the set range is different from the set range for the difference between the measured reaction force and the target reaction force data, and is a range that is separately set.

A deboning apparatus for meat with bone using an X-ray of the present invention that can be used in the implementation of the above-described method of the present invention is an apparatus that includes a multi-axis articulated arm provided with a cutting blade that operates based on a predetermined operation course and a device that suspends and transports an arm part or a thigh part of a carcass, and performs a deboning process in a state where the arm part or the thigh part is suspended, including an X-ray irradiation unit that is disposed on an upstream side of the multi-axis articulated arm in a direction of transport of the arm part or the thigh part and irradiates the X-ray to the suspended arm part or the suspended thigh part, an X-ray entrance unit into which the X-ray transmitted through the arm part or the thigh part enters, an image analysis process unit that analyzes a transmitted X-ray image having entered the X-ray entrance unit to obtain two-dimensional position information on an outline of a bone, and a controller that controls an operation of the cutting blade, the controller including a comparison reference point setting unit that sets a comparison reference point on the outline of the bone of the arm part or the thigh part, a storage unit that stores three-dimensional position coordinates of a target operation course of the cutting blade and two-dimensional position coordinates of the comparison reference point corresponding to the three-dimensional position coordinates of the target operation course, and an operation course correction unit that determines a positional displacement amount between the two-dimensional position coordinates of the comparison reference point corresponding to the target operation course and two-dimensional position coordinates of the comparison reference point obtained in the image analysis process unit to determine a corrected operation course obtained by correcting the target operation course correspondingly to the positional displacement amount, wherein the cutting blade is operated on the corrected operation course determined in the operation course correction unit.

In the apparatus of the present invention, the comparison reference point setting unit sets one or more comparison reference points at positions that can be easily located on the outline of the bone of the work. In addition, the three-dimensional position coordinates of the target operation course and the two-dimensional position coordinates of the comparison reference point corresponding to the target operation course are preset, and the information is stored in the storage unit. The operation course correction unit determines the positional displacement amount between the stored two-dimensional position coordinates of the comparison reference point and the two-dimensional position coordinates of the comparison reference point obtained in the image analysis process unit, and corrects the target operation course correspondingly to the positional displacement amount. By performing this process on each work, it is possible to precisely operate the cutting blade along the outline of the bone of each work. As a result, it is possible to prevent the cutting blade from cutting into the bone, reduce the damage to the cutting blade to maintain high operation efficiency, and improve the yield. In addition, it is possible to avert the generation of the excessive load in the cutting blade, and hence it is possible to reduce the capacity and power of the drive device of the cutting blade.

The controller of the apparatus of the present invention preferably further includes an ankle measurement unit that determines an ankle bone diameter $W_1$ immediately below a clamping position of the suspension and transport device and an ankle bone diameter $W_2$ immediately above the clamping position thereof from the two-dimensional position coordinates of the outline of the bone obtained in the image analysis process unit, a work length measurement unit that determines a length $L_1$ from the clamping position to a joint and a length $L_2$ from the joint to an end of a condyle from the two-dimensional position coordinates of the bone obtained in the image analysis process unit when the ankle bone diameter $W_1$ is larger than the ankle bone diameter $W_2$ in the ankle measurement unit, and an image information correction unit that changes, when a ratio between the length $L_1$ and the length $L_2$ is out of a normal range, the ratio between the lengths to a normal value to correct the two-dimensional position information on the bone obtained in the image analysis process unit.

$W_1$ and $W_2$ are measured by the X-ray image analysis and, when $W_1 > W_2$ is satisfied, the lengths $L_1$ and $L_2$ are further measured by the X-ray image analysis. When the ratio between $L_1$ and $L_2$ is out of the normal range, the ratio therebetween is changed to the normal value and the two-dimensional position information on the checkpoint is recalculated. With this, even when the clamping position of the work is abnormal, it is possible to match the operation course of the cutting blade with the actual outline of the bone of the work.

The apparatus of the present invention preferably further includes a reaction force measurement device that measures a reaction force applied to the cutting blade, wherein the storage unit of the controller preferably stores target reaction force data obtained by measuring a reaction force applied to the cutting blade when the cutting blade operates on the target operation course, and the controller preferably further includes an operation course change unit that changes, when a difference between a reaction force measured by the reaction force measurement device during a cutting operation of the cutting blade and the target reaction force data is out of a set range, the operation course of the cutting blade such that the measured reaction force falls within the set range. For example, when the measured reaction force is higher than the upper limit of a threshold value, the operation course change unit moves the cutting blade in a direction in which the cutting blade is moved away from the bone to return the measured reaction force to a value not more than the threshold value and, when the measured reaction force is lower than the threshold value, the operation course change unit moves the cutting blade close to the bone to return the measured reaction force within the threshold value.

Thus, since the reaction force applied to the cutting blade is measured and the operation course is corrected in the operation course change unit on the basis of the reaction force data, it is possible to further precisely operate the cutting blade along the surface of the bone. As a result, it is possible to further improve the yield of meat, avert the excessive load applied to the cutting blade, and avert the breakage of the blade and the cutting of the bone.

In the apparatus of the present invention, it is preferable that the controller sets a check point at a position where an excessive load tends to be generated in the cutting blade on the operation course of the cutting blade, the reaction force measurement device measures the reaction force applied to the cutting blade during the cutting operation in a region on an upstream side of the check point and, when the difference between the measured reaction force and the target reaction force data is out of the set range, the operation course change unit changes the corrected operation course from a point, where the reaction force is measured, to the check point such that the difference falls within the set range. By setting the check point at the joint part or the condyle part where many uneven variation points are present, it is possible to prevent the generation of the excessive load in the cutting blade beforehand, and also prevent the cutting of the cutting blade into the bone, the damage to the cutting blade, and the cutting of the bone.

The controller of the apparatus of the present invention preferably stores measurement data on a reaction force applied to the cutting blade during a no-load operation in the storage unit, and preferably further includes a determination unit that compares the reaction force applied to the cutting blade during the cutting operation of the cutting blade and the stored no-load reaction force data and, when a difference between the reaction force and the stored no-load reaction force data is out of a set range, determines that the cutting blade is damaged to issue an operation halt instruction. With this, it is possible to speedily detect the damage to the cutting blade to halt the operation of the deboning apparatus. Note that the set range is different from the set range for the difference between the measured reaction force and the target reaction force data, and is a range that is separately set.

According to the method of the present invention, since a method in which, in a state where an arm part or a thigh part of a carcass is suspended via an ankle, a deboning process of the arm part or the thigh part is performed by using a multi-axis articulated arm provided with a cutting blade that operates based on a predetermined operation course includes a preliminary step of setting a comparison reference point on an outline of a bone of the arm part or the thigh part, and also presetting three-dimensional position coordinates of a target operation course of the cutting blade and two-dimensional position coordinates of the comparison reference point corresponding to the three-dimensional position coordinates of the target operation course, an X-ray image analysis step of irradiating the X-ray to each arm part or each thigh part to obtain two-dimensional position coordinates of the outline of the bone of the arm part or the thigh part by analyzing a transmitted X-ray image, an operation course correction step of determining a positional displacement amount between the two-dimensional position coordinates of the comparison reference point corresponding to the target operation course and the two-dimensional position coordinates of the comparison reference point obtained in the X-ray image analysis step to determine a corrected operation course obtained by correcting the target operation course correspondingly to the positional displacement amount, and a cutting blade operation step of operating the cutting blade on the corrected operation course determined in the operation course correction step to perform meat cutting or meat separation of the arm part or the thigh part, and it is possible to precisely detect the shape of the bone inside the meat, especially the complicated shape and the position of the knee part or the condyle of the thigh bone for each work by analyzing the X-ray image of each work, it is possible to allow the deboning process having high accuracy as compared with the conventional process method in which the shape of the bone is presumed according to an empirical rule. With this, it is possible to improve the yield of meat, avert the damage to the cutting blade or the cutting of the bone, prevent a foreign object such as a bone fragment or the like from mixing into the meat, and allow a high-efficiency deboning process.

In addition, according to the apparatus of the present invention, since an apparatus that includes a multi-axis articulated arm provided with a cutting blade that operates based on a predetermined operation course and a device that suspends and transports an arm part or a thigh part of a carcass, and performs a deboning process in a state where the arm part or the thigh part is suspended includes an X-ray irradiation unit that is disposed on an upstream side of the multi-axis articulated arm in a direction of transport of the arm part or the thigh part and irradiates the X-ray to the suspended arm part or the suspended thigh part, an X-ray entrance unit into which the X-ray transmitted through the arm part or the thigh part enters, an image analysis process unit that analyzes a transmitted X-ray image having entered the X-ray entrance unit to obtain two-dimensional position information on an outline of a bone, and a controller that controls an operation of the cutting blade, the controller includes a comparison reference point setting unit that sets a comparison reference point on the outline of the bone of the arm part or the thigh part, a storage unit that stores three-dimensional position coordinates of a target operation course of the cutting blade and two-dimensional position coordinates of the comparison reference point corresponding to the three-dimensional position coordinates of the target operation course, and an operation course correction unit that determines a positional displacement amount between the two-dimensional position coordinates of the comparison reference point corresponding to the target operation course and two-dimensional position coordinates of the comparison reference point obtained in the image analysis process unit to determine a corrected operation course obtained by correcting the target operation course correspondingly to the positional displacement amount, and the cutting blade is operated on the corrected operation course determined in the operation course correction unit, it is possible to achieve the operation and effect similar to those of the above-described method of the present invention, and also realize a high-efficiency automatic deboning apparatus.

BRIEF DESCRIPTION OF THE DRAWINGS

FIG. 22A is a table showing an amount of remaining meat on the work in the first embodiment;

FIG. 22B is a table showing an amount of remaining meat on the work in a conventional deboning process;

FIG. 23A is a view showing a state of remaining meat on a knee joint of the work in the first embodiment;

FIG. 23B is a view showing a state of remaining meat below the knee joint of the work in the first embodiment;

FIG. 29 is a step diagram of a preliminary process step according to a second embodiment in which the present invention is applied to the deboning process of a pig arm part.

BEST MODE FOR CARRYING OUT THE INVENTION

Figure 1:
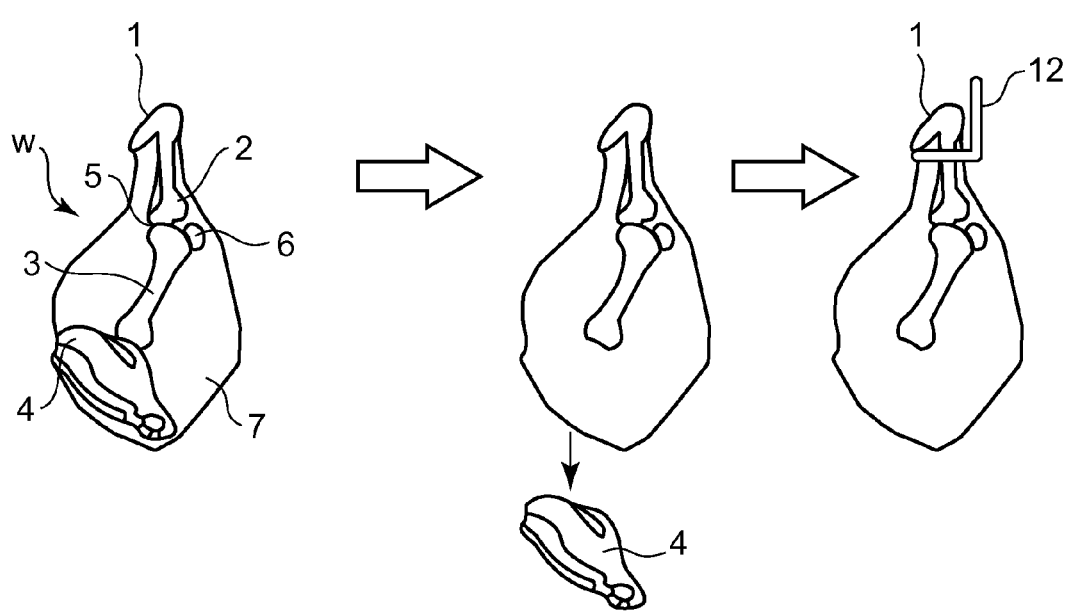
FIG. 1 is a step diagram of a preliminary process step according to a first embodiment in which the present invention is applied to a deboning process of a pig thigh part.

A detailed description is given hereinbelow of the present invention by using embodiments shown in the drawings. Note that the scope of the invention is not limited only to dimensions, materials, shapes, and relative arrangements of constituent parts described in the embodiments unless specifically described.

A description is given of a first embodiment in which the present invention is applied to a deboning step of a pig thigh part on the basis of FIGS. 1 to 28. FIG. 1 shows a pig thigh part was a deboning target (hereinafter referred to as a "work w"). In FIG. 1, bones of the work w include a lower leg bone 2, a thigh bone 3, a hip bone 4, and a kneepan 6 (patella) in the vicinity of a knee joint 5 that joins the lower leg bone 2 and the thigh bone 3 arranged from the side of an ankle 1, and a meat part 7 adheres to these bones. Before the work w is subjected to a deboning process by an automatic deboning apparatus of the present embodiment, the hip bone 4 is manually removed by an operator as a preliminary process, and the work w is suspended from a clamping device 12 of the automatic deboning apparatus by a feed device. The work w moves among individual process devices constituting the automatic deboning apparatus in a state where the work w is suspended from the clamping device 12.

Figure 2:
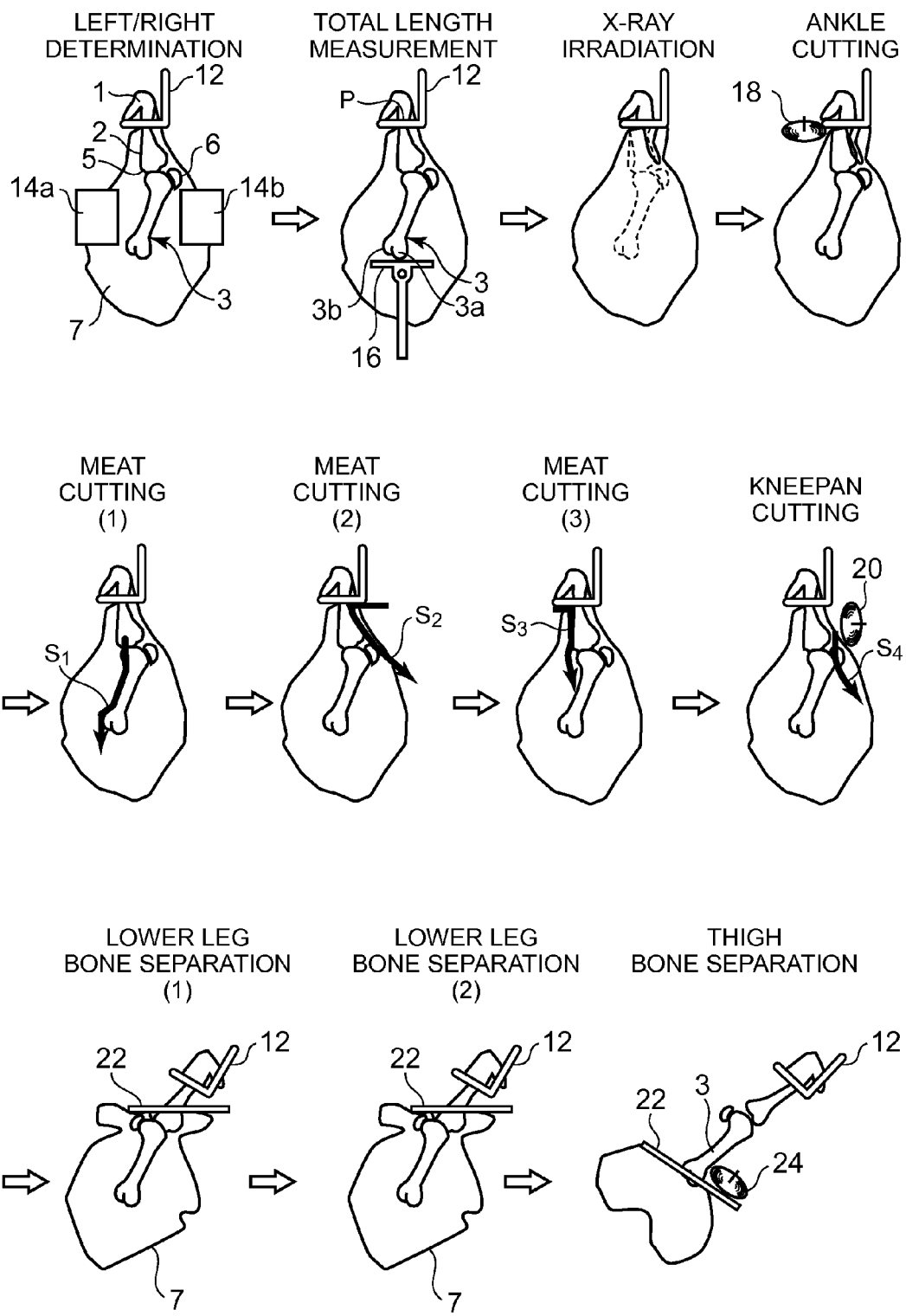
FIG. 2 is a step diagram of an automatic deboning deboning process of the first embodiment.

FIG. 2 is a flowchart showing all deboning steps according to the present embodiment and, based on FIG. 2, the outline of all of the deboning steps of the present embodiment are described. In FIG. 2, first, in a left/right determination step, the meat thickness of each of left and right parts of the work w is measured by two sets of measurement plates 14a and 14b, and it is determined whether the work w is a right leg or a left leg from a difference in meat thickness between the right and left parts. Next, in a total length measurement step, the total length of the bones of the work w is measured. The work w has uneven parts at the knee joint 5 and the condyle part of the thigh bone 3. At the condyle part of the thigh bone 3, a spherical thigh ball $3a$ and a major trochanter $3b$ are present. With a measurement plate 16 being abutted on the thigh ball $3a$ positioned at the lowest end of the thigh bone 3 from below, the total length of the bones is measured from a distance between a reference point P corresponding to the upper surface position of the clamping device 12 and the measurement plate 16.

Next, in an X-ray irradiation step, an X-ray is irradiated to the work w, an image of the X-ray transmitted through the work w is analyzed, and two-dimensional position information on the outlines of the bones is thereby obtained. Then, in an ankle cutting step, as a stage prior to a meat cutting step, a cut is made in the periphery of the ankle 1 by a rotating circular blade 18 disposed in a parallel direction, and body tissues such as a muscle and a tendon adhering to the periphery of the ankle are thereby cut. Subsequently, three-stage meat cutting steps (1) to (3) are performed, and cuts indicated by meat cutting lines $S_1$ to $S_3$ are made along the surfaces of the bones toward longitudinal directions of the bones. Then, in a kneepan cutting step, as indicated by a cut line $S_4$, a cut is made along the side surface of the kneepan 6 by a rotating circular blade 20 disposed in a vertical direction. With this, body tissues adhering to the side surface of the kneepan are cut and meat separation performed in a subsequent step is facilitated.

Next, in a lower leg bone separation step (1) and a lower leg bone separation step (2), a separator 22 is pressed against the upper surface of the meat part 7 and is pulled down, whereby the meat part 7 is torn from the lower leg bone 2. Subsequently, in a thigh bone separation step, the separator 22 is further pulled down while the body tissues such as the muscle and the tendon adhering to a part in the vicinity of the condyle of the thigh bone 3 are cut by a circular blade 24, whereby the meat part 7 is separated from the thigh bone 3.

Figure 3:
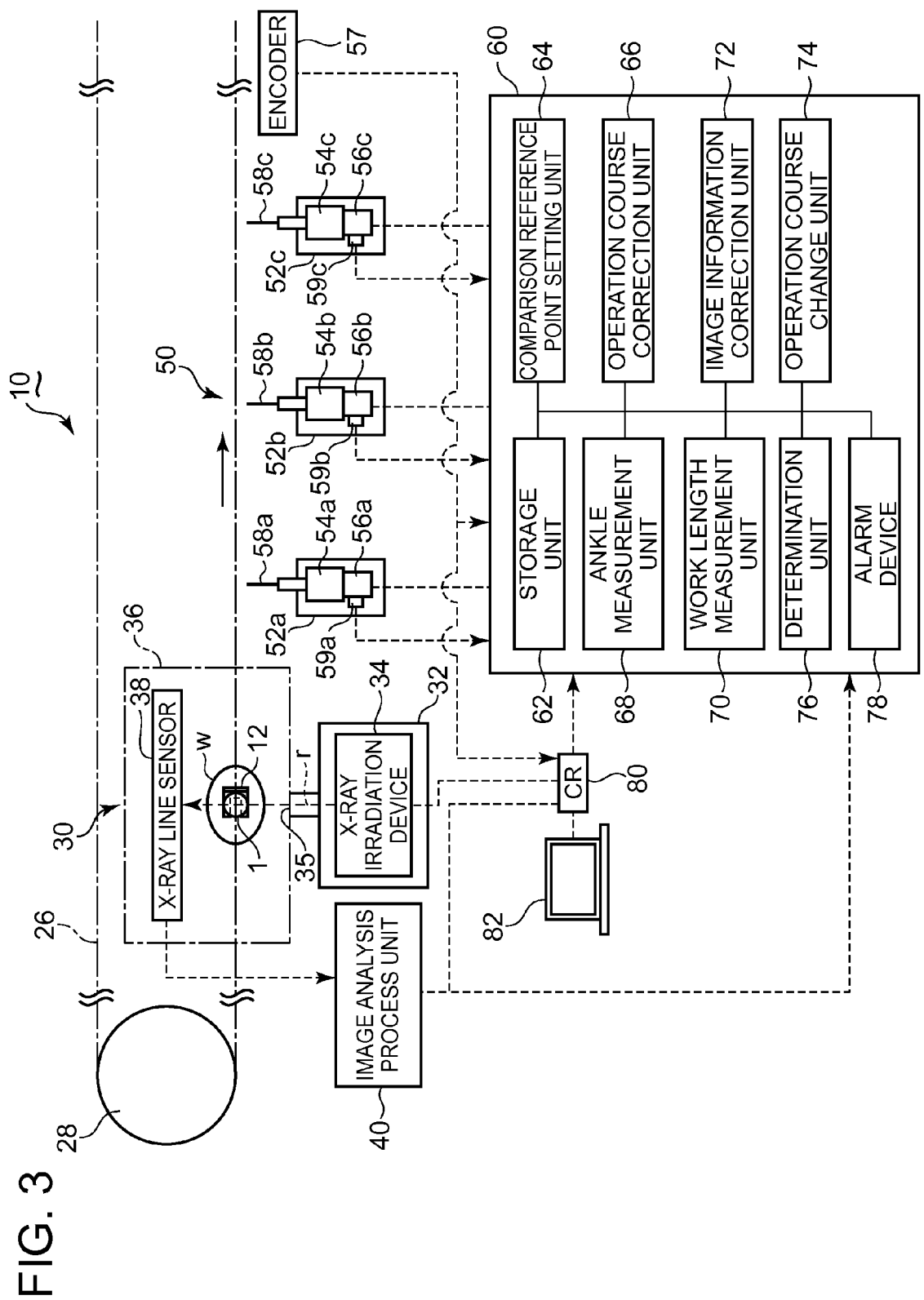
FIG. 3 is a block diagram of an automatic deboning apparatus of the first embodiment.

FIG. 3 shows a part of an automatic deboning apparatus 10 according to the present embodiment (an X-ray irradiation unit 30 and a meat cutting unit 50). In FIG. 3, a transport chain 26 is disposed in a horizontal direction so as to connect individual process stations, and the transport chain 26 is wound on a driven sprocket 28 and a driving sprocket (not shown) and is moved by the driving sprocket in a direction indicated by an arrow. A large number of the clamping devices 12 are attached to the transport chain 26 at regular intervals, and the work w is suspended from each clamping device 12 via the ankle 1 and is transported in the direction indicated by the arrow.

In the X-ray irradiation unit 30, an X-ray irradiation device 34 is provided inside an X-ray box 32. A region surrounded by a shield wall 36 is disposed forwardly of the X-ray box 32, and an X-ray line sensor 38 is disposed in the region. A transport path for the work w is arranged so as to cross the shield wall 36 and, when the work w is about to enter the shielded region, the part of the shield wall 36 facing the transport path is opened. After the work w has entered inside the shield wall 36, the shield wall 36 is closed. The shield wall 36 is provided with an irradiation window 35 at a position from which an X-ray r is irradiated to the work w, and the X-ray r is irradiated to the work w from the X-ray irradiation device 34 through the irradiation window 35. The image of the X-ray transmitted through the work w is inputted to the X-ray line sensor 38. The X-ray transmission image inputted to the X-ray line sensor 38 is shown on a display 82 of a controller 80 that controls an overall operation of the automatic deboning apparatus 10.

The X-ray transmission image inputted to the X-ray line sensor 38 is subjected to image analysis in an image analysis process unit 40, and two-dimensional position coordinates of the outline of bones of the work w can be thereby obtained. The two-dimensional position coordinates are sent to the controller 80 and a robot controller 60 described later. The meat cutting unit 50 is disposed on the downstream side of the X-ray irradiation unit 30 in the direction of transport of the work. Herein, along the transport chain 26, there are provided three meat cutting robots 52a to 52c that perform the three-stage meat cutting steps. The individual meat cutting robots have multi-axis articulated arms of four or six axes 54a to 54c and electric motors 56a to 56c that operate the multi-axis articulated arms. To the tips of the multi-axis articulated arms, knife-shaped cutting blades 58a to 58c are attached.

In addition, there are provided a robot controller 60 that controls the multi-axis articulated arms 54a to 54c to control the operations of the cutting blades 58a to 58c by controlling the electric motors 56a to 56c, and torque sensors 59a to 59c that detect torques applied to the individual cutting blades during the operations. The torque sensor detects a torque value applied to the cutting blade by detecting the current value flowing in each of the electric motors 56a to 56c. During the operation of the automatic deboning apparatus 10, the torque values applied to the electric motors 56a to 56c are constantly detected by the torque sensors 59a to 59c, and detection signals of the individual torque sensors are inputted to the robot controller 60. The transport position of each work w is detected by an encoder 57 and is inputted to the controller 80 and the robot controller 60.

Figure 4:
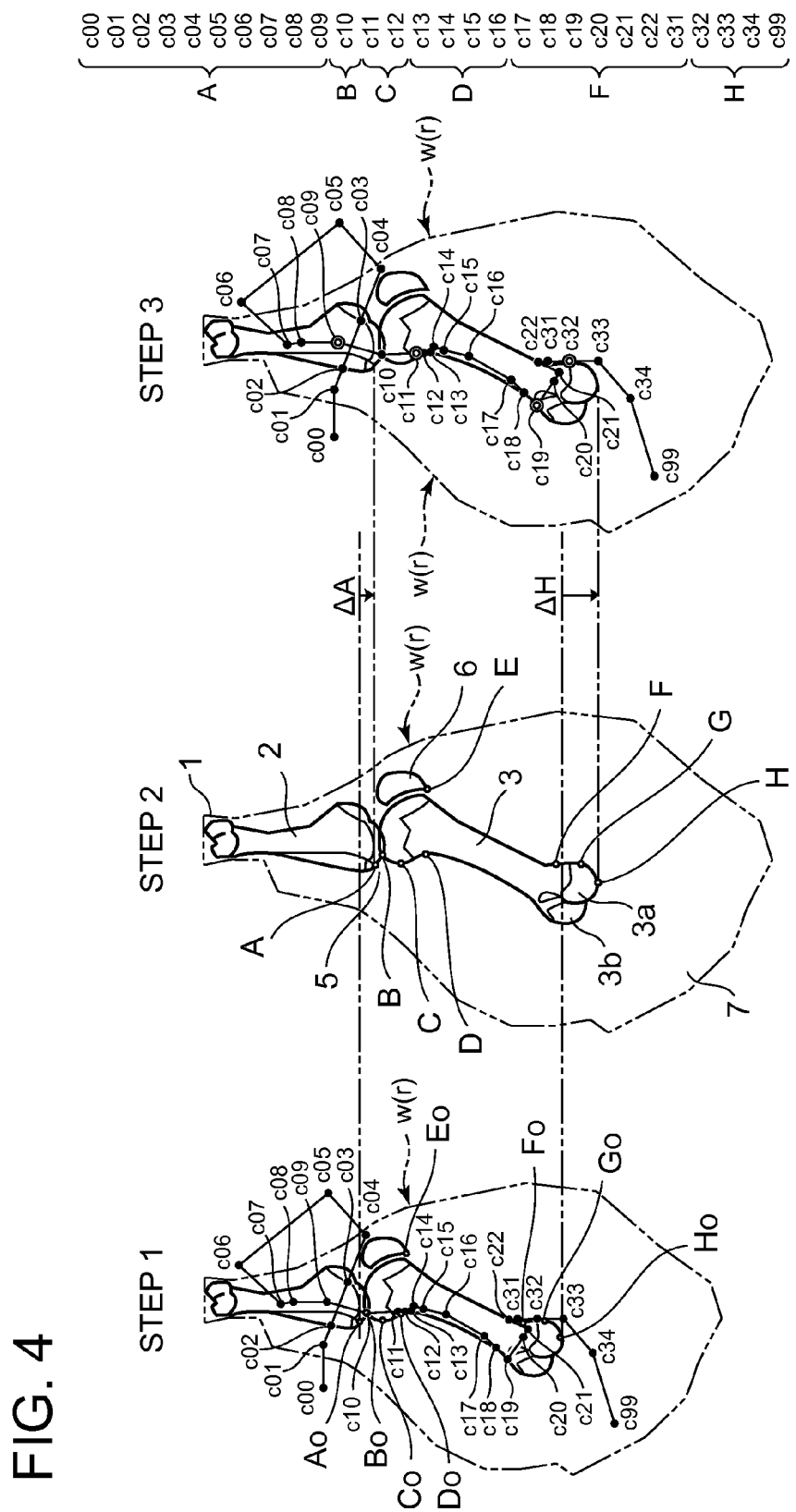
FIG. 4 is a structural view of the pig thigh part on which an operation course of a cutting blade and comparison reference points are set in the first embodiment.

FIG. 4 shows an operation course for a right-leg work w (r) used in the meat cutting step (1) as an example of the operation course of the cutting blade. In the drawing, Step 1 shows a target operation course. The target operation course is based on the assumption that the work w has the average size and the average shape. Comparison reference points $A_0$ to $H_0$ are preset at eight positions on the outlines of the bones, and teaching points c00 to c99 are set on the target operation course. The comparison reference points are set at parts having characteristics of the shape of the bone.

Step 2 in FIG. 4 shows the transmission image of the work w(r) inputted to the X-ray line sensor 38. Two-dimensional position coordinates of the comparison reference point $A_0$ of Step 1 and two-dimensional position coordinates of a comparison reference point A of Step 2 (two-dimensional position coordinates determined by analyzing the transmission image in the image analysis process unit 40) are compared with each other, and a positional displacement amount $\Delta A$ is determined. Next, three-dimensional position coordinates of the teaching points c00 to c09 of Step 2 are corrected correspondingly to the positional displacement amount $\Delta A$. In the same manner, the positional displacement amount of each comparison reference point is determined, and the position of the teaching point corresponding to each comparison reference point is corrected correspondingly to the positional displacement amount.

The correspondence between the comparison reference point and the teaching point is shown in Step 3. For example, the position of the teaching point c10 is corrected accordingly to the positional displacement amount of the comparison reference point B, and the positions of the teaching points c11 and c12 are corrected correspondingly to the positional displacement amount of the comparison reference point C. Step 3 shows a corrected operation course. Thus, the cutting blade 58a is operated on the corrected operation course.

In addition, among the teaching points, a teaching point having a high possibility of occurrence of a risk that the cutting blade 58a cuts into the bone is set as a check point. In Step 3, the check points include c09, c11, c19, and c32 (indicated by double circles). The monitoring of the torque value applied to the cutting blade 58a is started from a region on the upstream side of the set check point. According to the result of the monitoring, the corrected teaching point is further corrected. That is, when the torque value is higher than an upper limit value of a set range in the region on the upstream side of the check point, the operation course is changed in a direction in which the cutting blade 58a is moved away from the bone and, when the torque value is lower than a lower limit value, the operation course is changed in a direction in which the corrected teaching point is moved close to the bone.

For example, the check point c19 has a high risk that the cutting blade 58a cuts into the condyle of the thigh bone. Consequently, the torque value applied to the cutting blade 58a is monitored from the teaching point c16 and, in the manner described above, the teaching points c16 to c19 are changed.

Figure 5A:
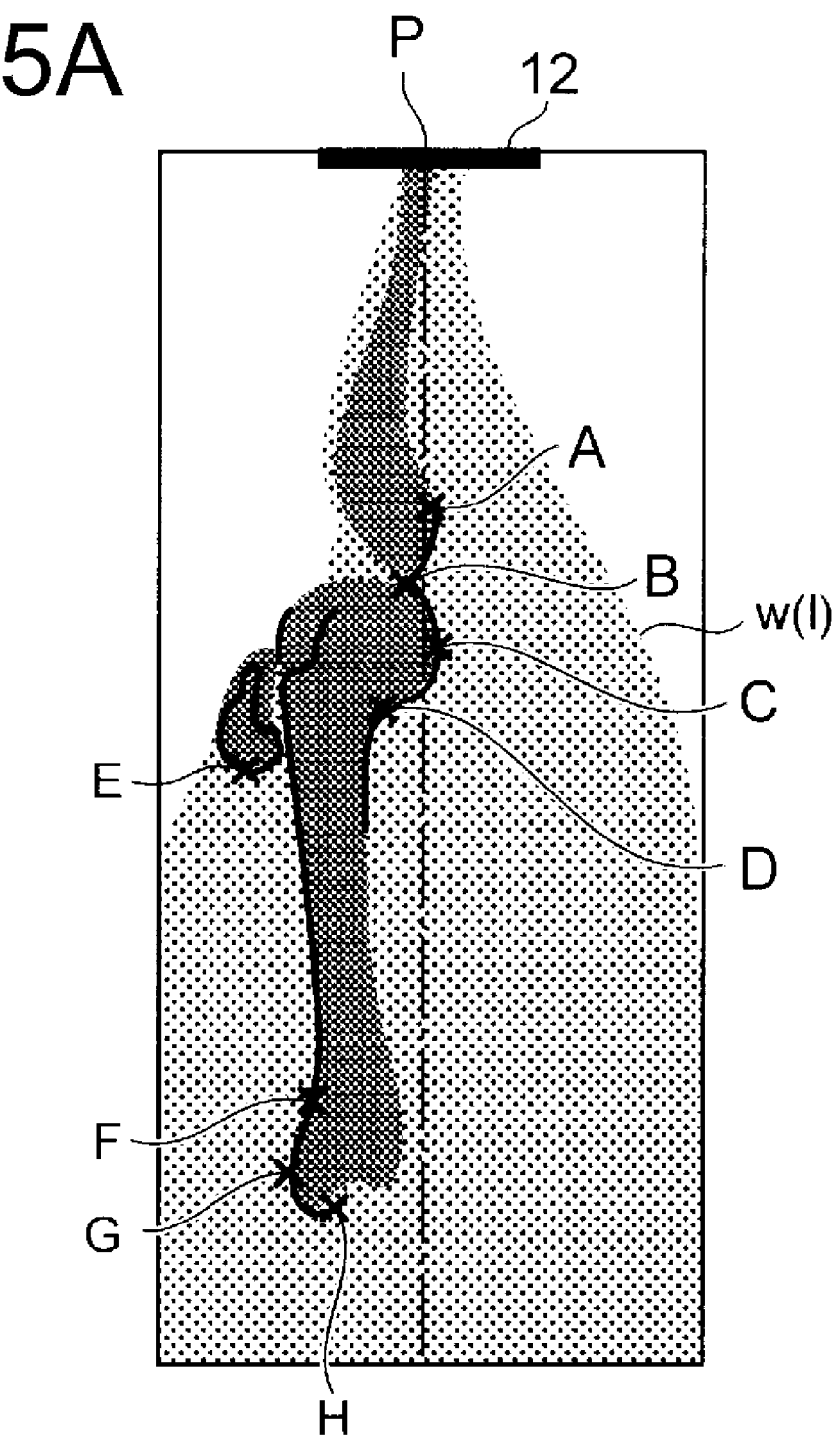
FIG. 5A is a view showing an X-ray transmission image of a pig thigh part of a left leg in the first embodiment.
Figure 5B:
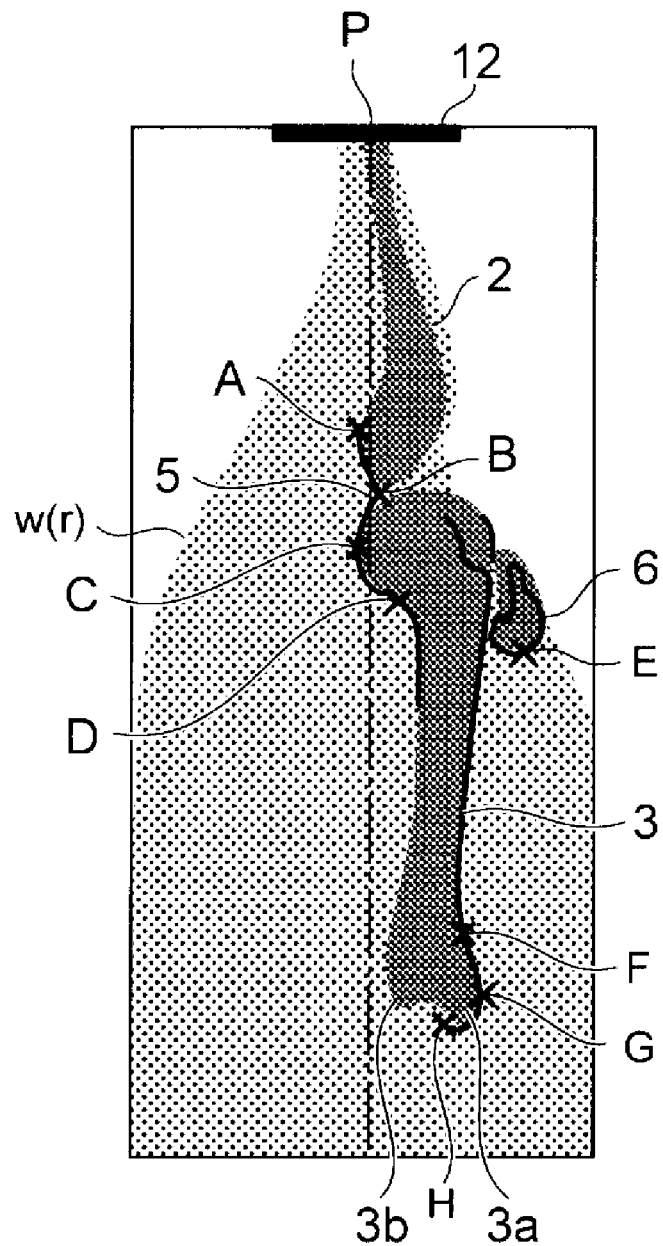
FIG. 5B is a view showing an X-ray transmission image of a pig thigh part of a right leg in the first embodiment.

FIGS. 5A and 5B show actual X-ray transmission images inputted to the X-ray line sensor 38. FIG. 5A shows a left-leg work, while FIG. 5B shows a right-leg work. The uneven parts of the work w are a part in the vicinity of the knee joint 5 and a part in the vicinity of the condyle of the thigh bone 3 and, in order to precisely perform meat cutting of particularly these uneven parts, it is necessary to obtain precise position information on the uneven parts. Accordingly, the comparison reference points A to H are set on the uneven parts. Although the comparison reference points are not set on the central part of the lower leg bone or the straight bone part of the central part of the thigh bone, the shapes of the outlines of the bones of these parts can be determined by performing interpolation using the reference point P of the clamping device 12 and the comparison reference points on the joint and the condyle. In the image analysis process unit 40, two-dimensional position coordinates of these comparison reference points are obtained, and the target operation course of the cutting blade 58a is corrected on the basis of the position information.

In FIG. 3, a comparison reference point setting unit 64 sets the comparison reference points $A_0$ to $H_0$ on the outlines of the knee joint 5 and the condyle part of the thigh bone 3 of the work w before the X-ray irradiation step. A storage unit 62 of the robot controller 60 stores the two-dimensional position coordinates of the comparison reference points $A_0$ to $H_0$, the three-dimensional position coordinates of the target operation course of the cutting blades 58a to 58c, measurement data on the torque value applied to the cutting blade when the cutting blade operates on the target operation course (hereinafter referred to as "target torque data"), and measurement data on the torque value applied to the cutting blade during a no-load operation in which the cutting blade is operated without the work (hereinafter referred to as "no-load torque data"). The target operation course is set on the assumption that the pig thigh part has the average size and shape.

Figure 12A:
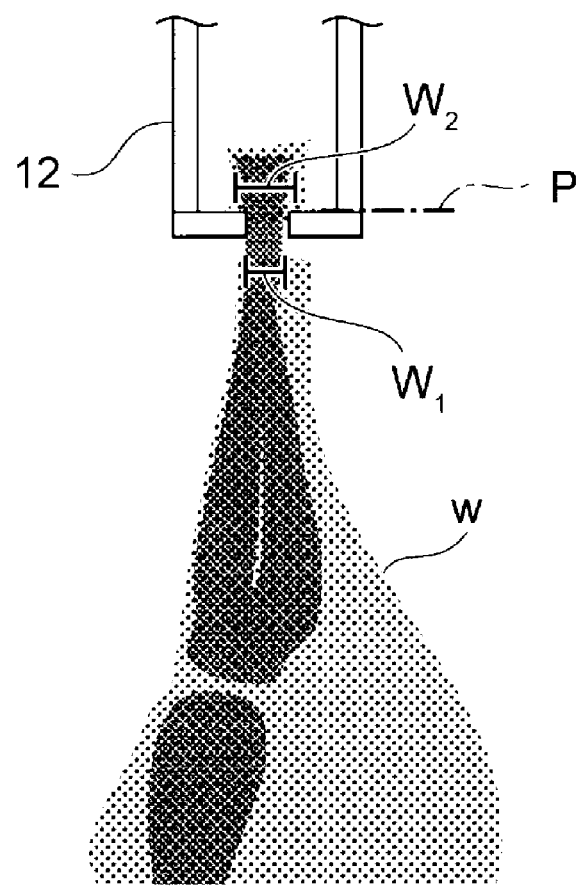
FIG. 12A is a view of an X-ray transmission image showing a normal clamping state of the work in the first embodiment.
Figure 12B:
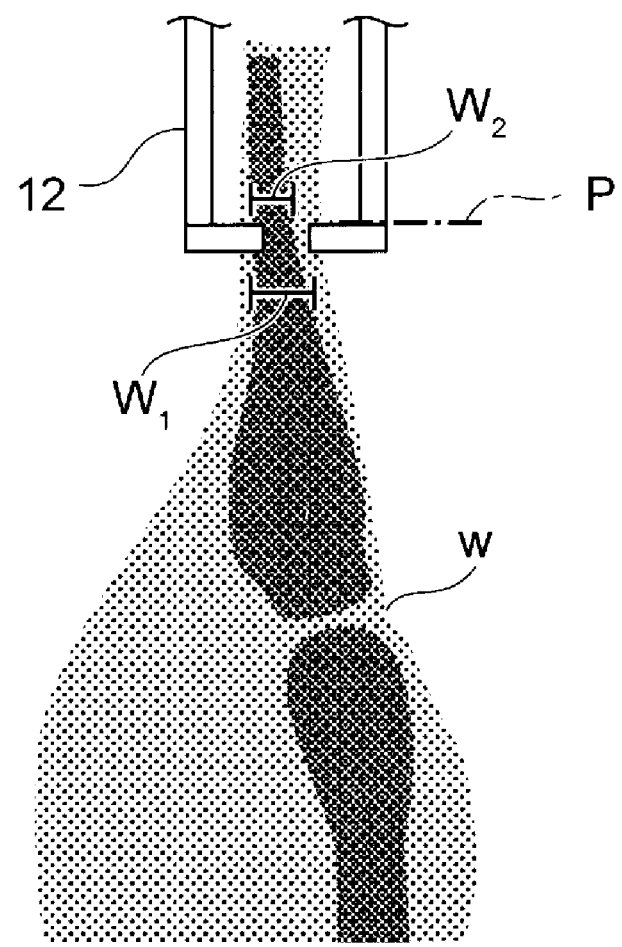
FIG. 12B is a view of an X-ray transmission image showing an abnormal clamping state of the work in the first embodiment.

An operation course correction unit 66 determines the positional displacement amounts between the two-dimensional position coordinates of the comparison reference points $A_0$ to $H_0$ corresponding to the target operation course and the two-dimensional position coordinates of the comparison reference points A to H of the X-ray transmission image obtained in the image analysis process unit 40 to determine a corrected operation course obtained by correcting the target operation course, i.e., the teaching points correspondingly to the positional displacement amounts. An ankle measurement unit 68 determines an ankle bone diameter $W_1$ immediately below the reference point P of the clamping device 12 and an ankle bone diameter $W_2$ immediately above the reference point P thereof from the two-dimensional positional coordinates of the bones obtained in the image analysis process unit 40, as shown in FIGS. 12A and 12B.

Figure 13:
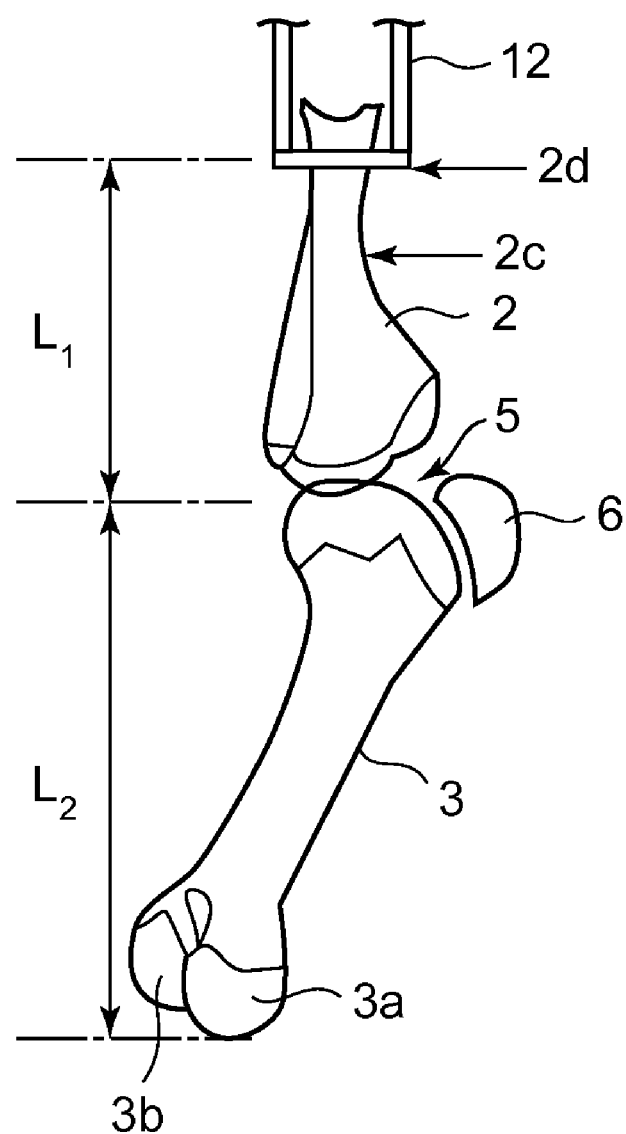
FIG. 13 is an explanatory view of a skeleton of the work in the first embodiment.

As shown in FIG. 13, a work length measurement unit 70 determines a length $L_1$ from the clamp reference point P to the knee joint 5 and a length $L_2$ from the knee joint 5 to the lower end of the thigh ball 3a from the two-dimensional position coordinates of the bones obtained in the image analysis process unit 40. In an image information correction unit 72, when a ratio ($L_2/L_1$) is not in a normal range, the ratio is changed to the normal value to correct the two-dimensional position coordinates of the X-ray transmission image obtained in the image analysis process unit 40. An operation course change unit 74 issues an instruction to change the operation course to the electric motors 56a to 56c such that the difference between the torque value generated in the target operation course stored in the storage unit 62 and the torque value actually detected by each of the torque sensors 59a to 59c during the cutting operation falls within a set range.

A determination unit 76 compares the torque value applied to the cutting blade during the cutting operation and the no-load torque data stored in the storage unit 62 and, when the difference therebetween falls within a set range, determines that the cutting blade is damaged, and issues an signal for halting the operation of the automatic deboning apparatus 10 to the controller 80. An alarm unit 78 issues an alarm when the difference falls within the set range.

Figure 6A:
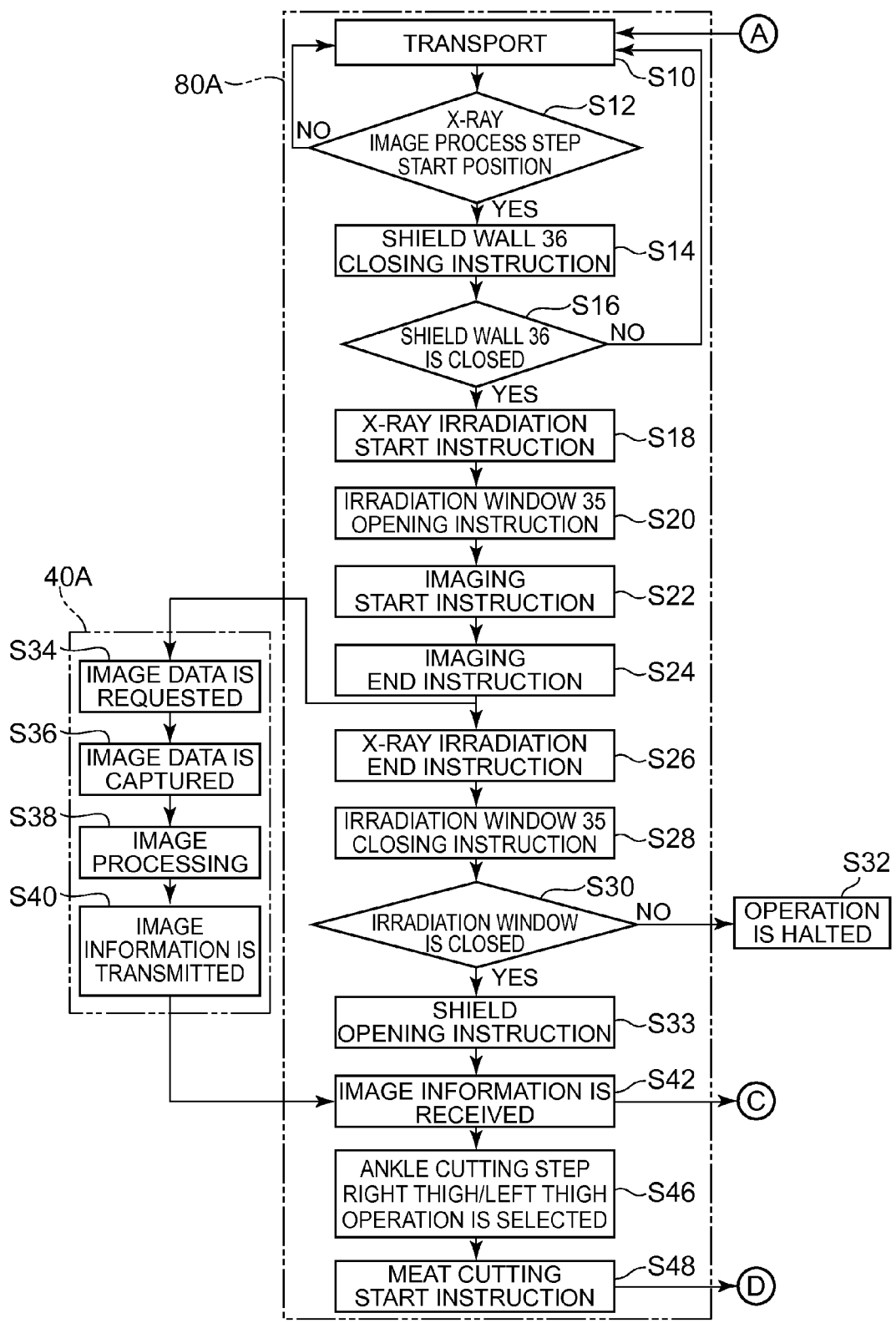
FIG. 6A is a flowchart showing operational procedures (the first half) of the automatic deboning apparatus in the first embodiment.
Figure 6B:
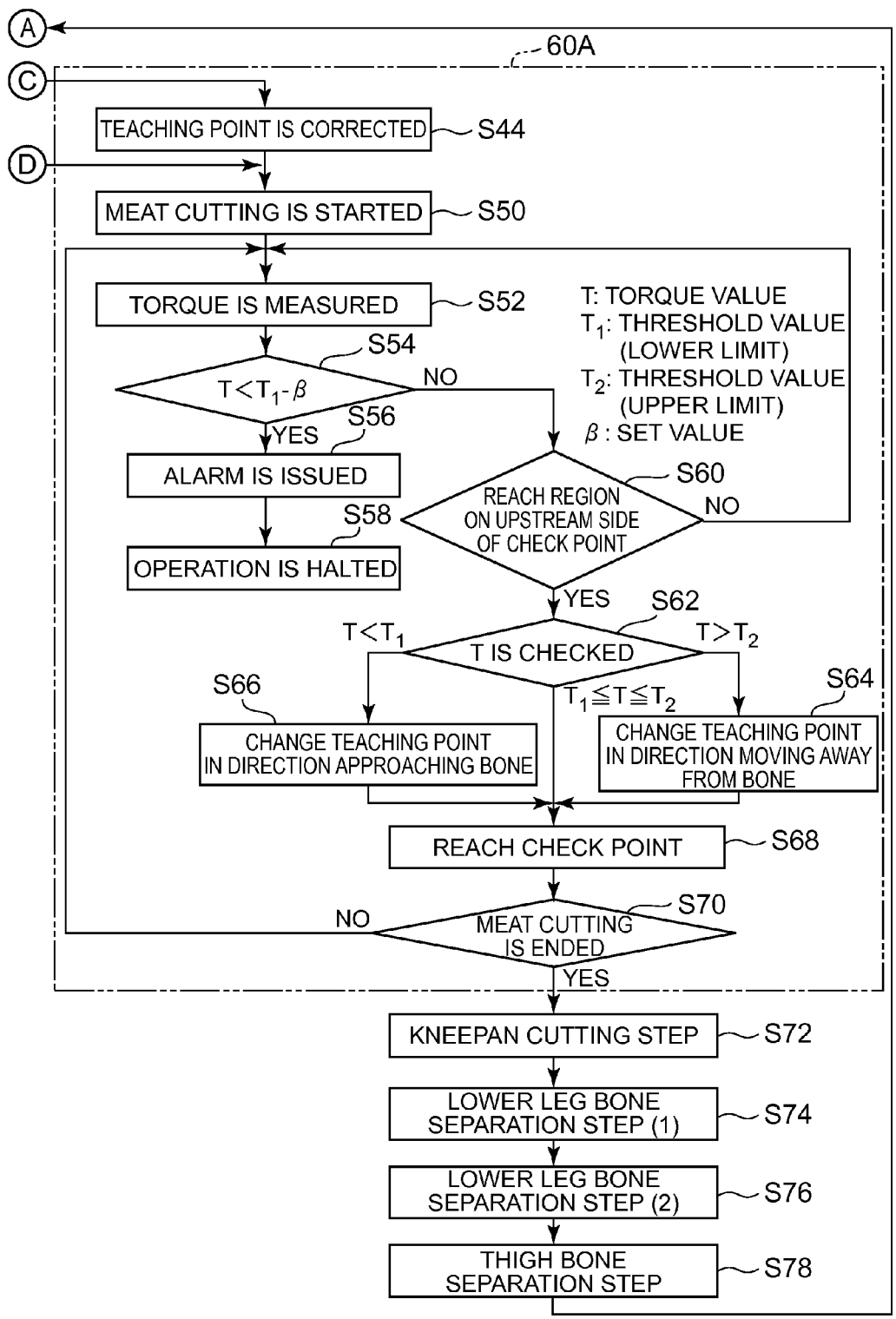
FIG. 6B is a flowchart showing operational procedures (the second half) of the automatic deboning apparatus in the first embodiment.

Next, a description is given of operational procedures of the automatic deboning apparatus 10 on the basis of flowcharts of FIGS. 6A and 6B. FIG. 6A shows the first half of the operational procedures, while FIG. 6B shows the second half of the operational procedures. The operation performed in the image analysis process unit 40 is shown within a frame 40A, the operation performed in the controller 80 is shown within a frame 80A, and the operation performed in the robot controller 60 is shown within a frame 60A. When the automatic deboning apparatus 10 is actuated and the transport of the work w is started (S10), the X-ray irradiation unit 30 becomes ready to start the image analysis process (S12). Next, a shield wall 36 shielding instruction is issued from the controller 80 (S14). When the shield wall 36 is not brought into a shielding state, the flow returns to the actuation of the automatic deboning apparatus 10. When it is determined that the shielding state is established (S16), an X-ray irradiation start instruction is issued from the controller 80 (S18).

Subsequently, an irradiation window 35 opening instruction is issued from the controller 80 (S20) and an imaging start instruction is issued from the controller 80 (S22), the X-ray r is irradiated from the X-ray irradiation device 34 through the irradiation window 35. The X-ray r transmitted through the work w is inputted to the X-ray line sensor 38. Then, an imaging end instruction (S24) and an X-ray irradiation end instruction (S26) are issued from the controller 80 and, when the X-ray irradiation is ended, an irradiation window 35 closing instruction is issued (S28). When it is determined that the irradiation window 35 is closed (S30), a shield wall 36 opening instruction is issued (S33). When the irradiation window 35 is not closed (S30), the operation of the automatic deboning apparatus 10 is halted (S32).

When the imaging is ended (S24), an instruction to request the X-ray transmission image is issued from the image analysis process unit 40 to the X-ray line sensor 38 (S34), the X-ray transmission image is captured into the image analysis process unit 40 (S36), and image processing is performed (S38). In the image processing, filtering and binarization are performed and a binarized image is thereby obtained. Subsequently, the binarized image is shown on two-dimensional coordinates and the two-dimensional position coordinates of the work w are obtained. The image processing is conventional, as disclosed in Patent Document 3. The two-dimensional position coordinates of the work w obtained in the image analysis process unit 40 are transmitted to the controller 80 (S40).

When receiving the two-dimensional position coordinates of the work w, the controller 80 sends the two-dimensional position coordinates to the robot controller 60 (S42), and also performs the ankle cutting step shown in FIG. 2 while selecting the operation of the apparatus according to whether the work w is the left leg or the right leg (S46). In the robot controller 60, the operation course correction unit 66 compares the two-dimensional position coordinates of the comparison reference points $A_0$ to $H_0$ of the target operation course stored in the storage unit 62 and the two-dimensional position coordinates of the comparison reference points A to H of the X-ray transmission image obtained in the image analysis process unit 40 to determine the positional displacement amounts and, as described above, corrects the three-dimensional position coordinates of the teaching points correspondingly to the positional displacement amounts (S44).

Thereafter, the controller 80 issues a meat cutting step start instruction to the robot controller 60 (S48). On reception of the instruction, the robot controller 60 issues a meat cutting step start instruction to each of the meat cutting robots 52a to 52c (S50). At the same time as the start of the meat cutting step, each of the torque sensors 59a to 59c starts the measurement of the torque value applied to each of the drive motors 56a to 56c (S52). When the torque value T<$T_1-\beta$ (set value) is satisfied until the end of the meat cutting step after the start of measurement of the torque value (S54), the determination unit 76 determines that one of the cutting blades 58a to 58c is damaged and in a no-load state. Subsequently, the alarm device 78 issues the alarm (S56), and the operation of the automatic deboning apparatus 10 is halted (S58). Note that the set value ($T_1-\beta$) can be a value different from a threshold value $T_1$ or $T_2$ by independently setting the value of $\beta$.

When each of the cutting blades 58a to 58c reaches the region on the upstream side of the check points c09, c11, c19, or c32 (S60), the torque value T is checked (S62). When the threshold value (lower limit) $T_1 \leq T \leq$ the threshold value (upper limit) $T_2$ is satisfied, the meat cutting is performed without changing the teaching point, and each of the cutting blades 58a to 58c is moved to the check point (S68). When the torque value T>$T_2$ is satisfied, the teaching points from the current position to the check point are changed in a direction in which the cutting blade is moved away from the bone surface by the operation course change unit 74 (S64).

In addition, when the torque value T<$T_1$ is satisfied, the teaching points from the current position to the check point are changed in a direction in which the cutting blade is moved close to the bone surface by the operation course change unit 74 (S66). Note that, as the threshold value (lower limit) $T_1$ and the threshold value (upper limit) $T_2$, different values are preset at the individual teaching points on the operation course and are stored in the storage unit 62.

When the meat cutting step is ended (S70), the kneepan cutting step is performed while the operation of the apparatus is selected according to whether the work w is the left leg or the right leg (S72). Further, the lower leg bone separation step (1) (S74), the lower leg bone separation step (2) (S76), and the thigh bone separation step (S78) are sequentially performed while the similar operation selection is performed.

Figure 7:
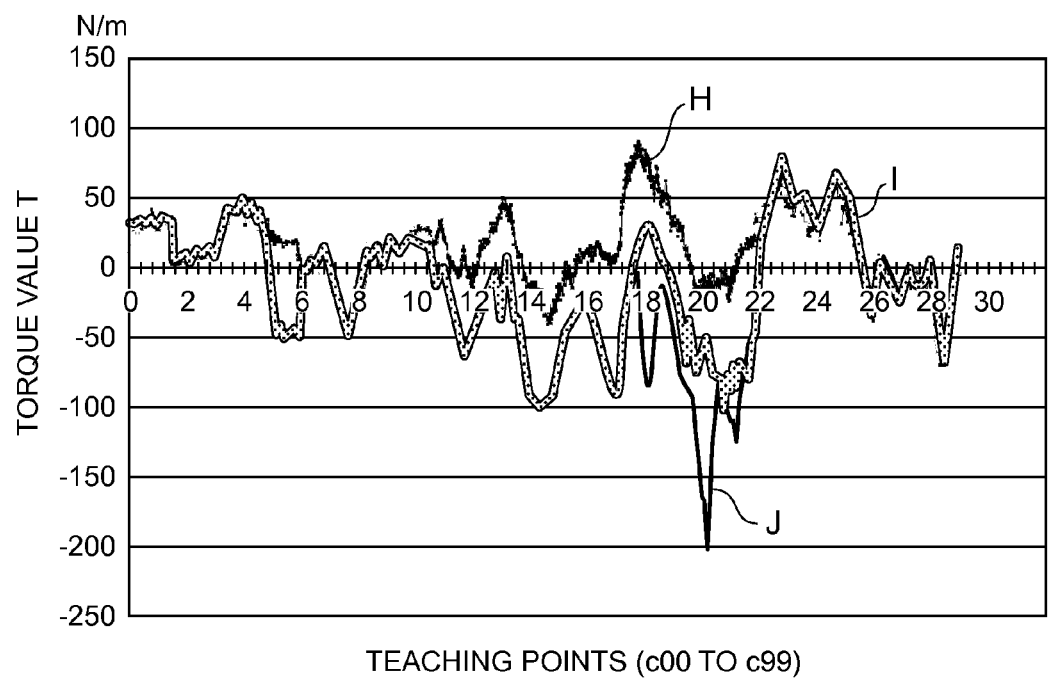
FIG. 7 is a diagram showing a torque value applied to the cutting blade in the first embodiment.

FIG. 7 shows an example of test data of the meat cutting step (1) in which the vertical axis indicates the torque value T applied to the electric motor 56a and the horizontal axis indicates the teaching points on the operation course. Figures of the horizontal axis correspond to those of the teaching points shown in FIG. 2. In FIG. 7, a curve H is a no-load torque data curve indicative of the torque value applied to the electric motor 56a when the cutting blade 58a is in the no-load state, while a curve I is a target torque data curve indicative of the torque value when the cutting blade operates on the target operation course, an excessive load is not applied to the cutting blade 58a, and the yield is excellent.

A curve J is a measured torque curve indicative of the measured torque value when the automatic deboning apparatus 10 is actually operated. It is shown that the torque value T has become higher than the target value indicated by the curve I in the vicinity of the teaching points c18 to c22 (positioned in the vicinity of the condyle of the thigh bone) of the measured torque curve J. As a result, it is shown that the torque value T could be returned to the normal value after the teaching point c22 by shifting the cutting blade 58a in a direction in which the cutting blade 58a is moved away from the bone part by the operation course change unit 74.

Figure 8:
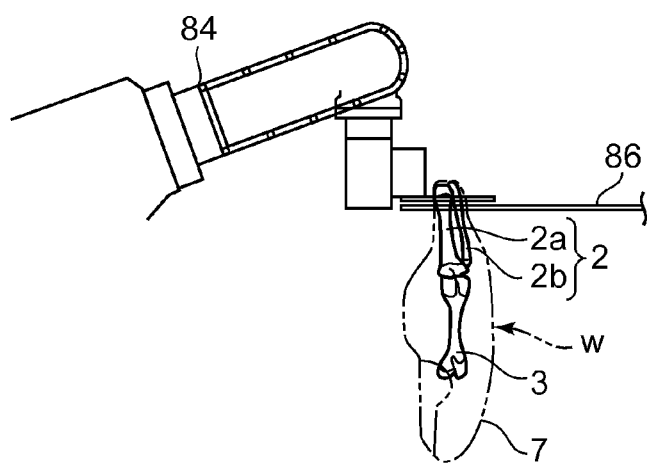
FIG. 8 is a front view of a work automatic feed apparatus in the first embodiment.

As shown in FIG. 8, on the upstream side of the X-ray irradiation unit 30 in the direction of transport of the work w, an automatic feed device 84 that suspends the work w from the clamping device 12 is provided. The work w is temporarily delivered to a clamping stage 86 from the automatic feed device 84 and, thereafter, the work w is pushed by a pusher (not shown) to be slid on the clamping stage 86 and inserted into the clamping device 12. Note that the lower leg bone 2 is constituted by a shin bone 2a and a calf bone 2b.

Figure 9:
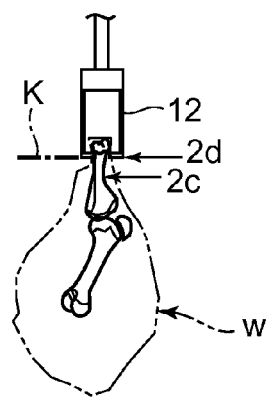
FIG. 9 is an explanatory view showing a normal clamping position of a work in the first embodiment.

FIG. 9 shows a state where the work w is delivered to the clamping device 12 at a normal clamping position K. As shown in FIG. 13, the ankle 1 has a part 2c where the cross-sectional diameter of the bone is extremely small at a position closer to the lower leg bone 2 than the tip thereof, and the work w is inserted in the clamping device 12 at a part in the vicinity of the extremely small diameter part 2c. Thereafter, the work w usually descends by its own weight, and is fixed to the clamping device 12 at an increased diameter part 2d closer to the tip than the extremely small diameter part 2c.

Figure 10:
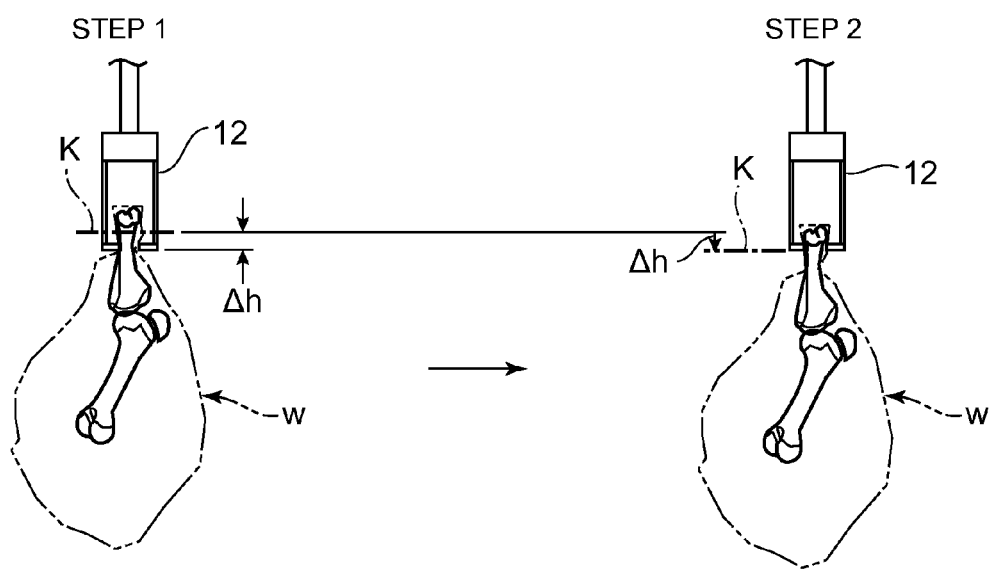
FIG. 10 is an explanatory view showing an abnormal clamping position of the work in the first embodiment.
Figure 11:
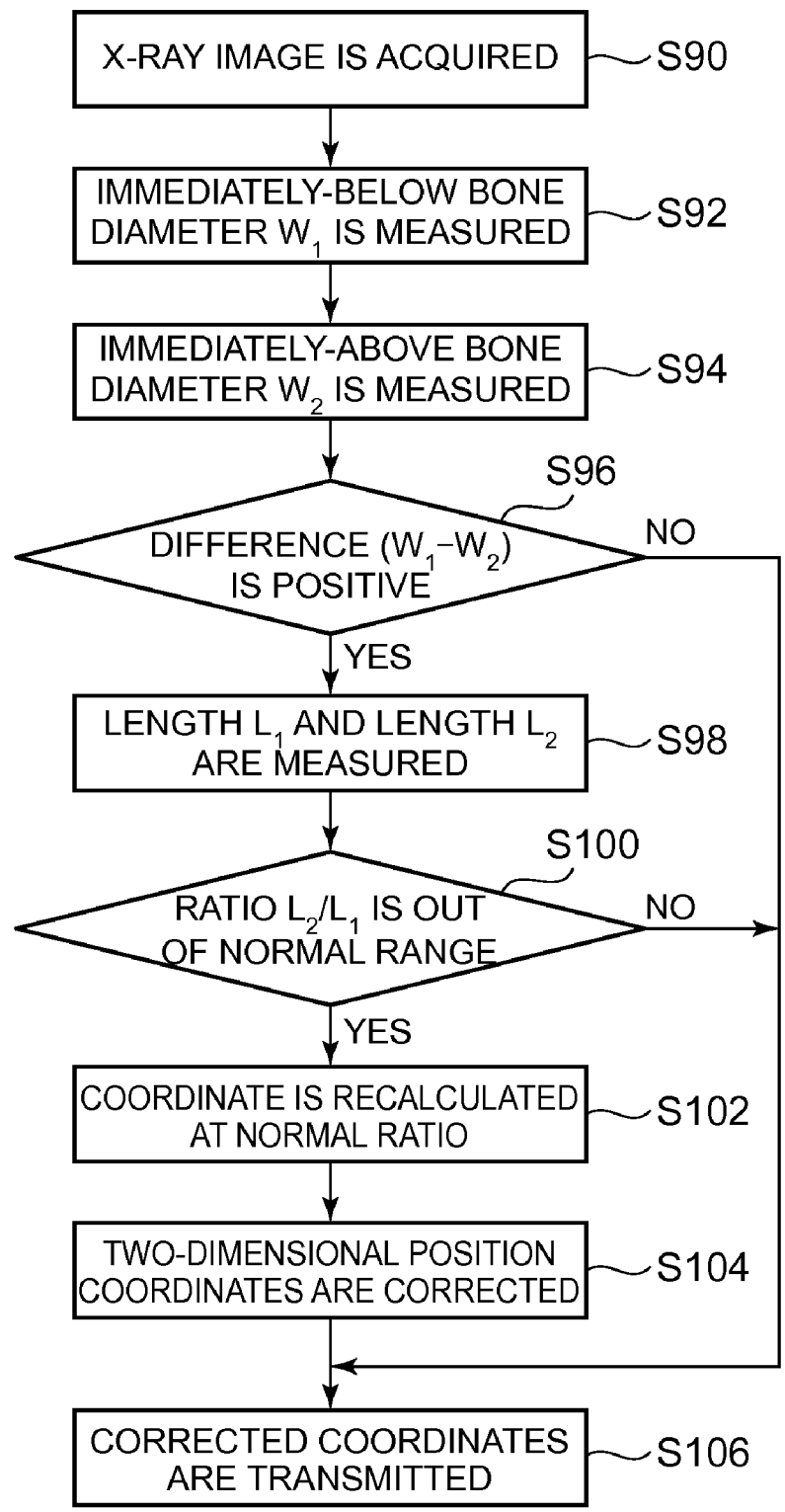
FIG. 11 is a flowchart showing an image information correction step in the first embodiment.

However, as shown in Step 1 in FIG. 10, due to a thin bone or a thick skin of the ankle 1 of the work w, there are cases where the work w is clamped at a position below the ankle 1, the clamping position is shifted from the normal clamping position K upwardly by Δh, and the work w does not descend by its own weight. When the X-ray irradiation is performed in this state and a downward load by the cutting blade is then applied to the work w in the meat cutting step as shown in Step 2 in FIG. 10, the work w descends to the increased diameter part 2d by Δh. As a result, a difference of Δh in the height of the work w is generated between during the X-ray irradiation and during the meat cutting. Consequently, the operation course of the cutting blade does not match the actual position of the work and, when the meat cutting is performed in this state, an excessive load is generated in the cutting blade, which leads to the damage to the cutting blade. A description is given of a method for preventing the damage on the basis of FIGS. 11 to 13.

In the normal clamping state, the diameter of the bone immediately above the clamping position should be larger than that of the bone immediately below the clamping position. By using this feature, it is determined whether or not the clamping position is normal. The determination procedures are described on the basis of the flowchart of FIG. 11. First, the X-ray irradiation unit 30 acquires the X-ray image of the work w (S90). FIGS. 12A and 12B show examples of the X-ray image. FIG. 12A shows a normal clamping position, while FIG. 12B shows an abnormal clamping position. Next, from the two-dimensional position coordinates of the work w obtained in the image analysis process unit 40, the ankle measurement unit 68 of the controller 60 determines an immediately-below bone diameter $W_1$ and an immediately-above bone diameter $W_2$ (S92 and S94).

When a difference ($W_1-W_2$) is positive (S96), from the two-dimensional position coordinates of the work w obtained in the image analysis process unit 40, the work length measurement unit 70 determines the length $L_1$ and the length $L_2$ shown in FIG. 13 (S98). When the difference ($W_1-W_2$) is negative, the two-dimensional position coordinates obtained in the image analysis process unit 40 are not corrected. Note that the length $L_1$ is a length from the clamping position to the knee joint 5, and the length $L_2$ is a length from the knee joint 5 to the lower end of the thigh ball 3a. Next, when the ratio ($L_2/L_1$) is not in the normal range (S100), the two-dimensional position coordinates are recalculated based on the normal ratio (S102), and the two-dimensional position coordinates are corrected (S104). Note that the normal range is a range where the ratio ($L_2/L_1$)=1.5 to 1.8 is satisfied in the case of the pig thigh part. The corrected two-dimensional position coordinates are transmitted to the controller 80 (S106).

Subsequently, a description is given of a meat cutting method in the meat cutting step (1) by taking the right-leg work w (r) as an example on the basis of FIGS. 14 to 17. As shown in FIG. 16, the meat part of the periphery of the thigh bone 3 is constituted by a top round a, a round tip b, and a bottom round c, and a fat layer d is present on the outside of the bottom round c. In the meat cutting step (1), a cut is made obliquely along a cutting line $C_1$ from the lower part of the lower leg bone 2 to the upper part of the kneepan 6 by the cutting blade 58a of the meat cutting robot 52a (c01 to c04). Thereafter, a cut is made again along a cutting line $C_2$ from above downwardly (c06 to c99). With the cutting line $C_2$, the cutting blade 58a is moved along a fascia e at the boundary between the top round a and the round tip b to cut the part between the top round a and the round tip b and cut a periosteum on the surface of the thigh bone. A hatching f shows a cut surface between the top round a and the round tip b, and a hatching g shows a cut surface along the surfaces of the lower leg bone 2 and the thigh bone 3.

Figure 17A:
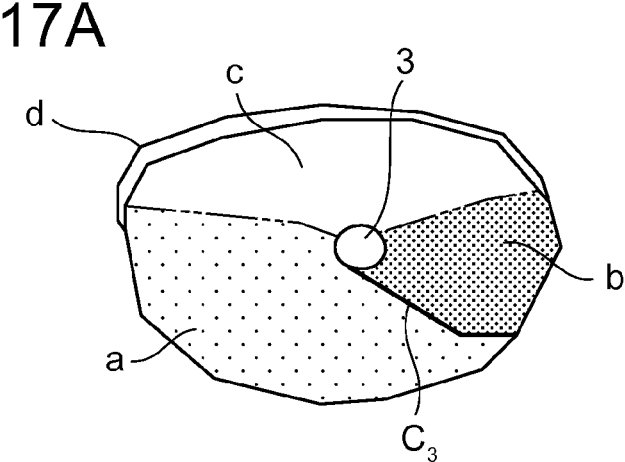
FIG. 17A is an explanatory view showing an excellent cutting line in the meat cutting step (1)
Figure 17B:
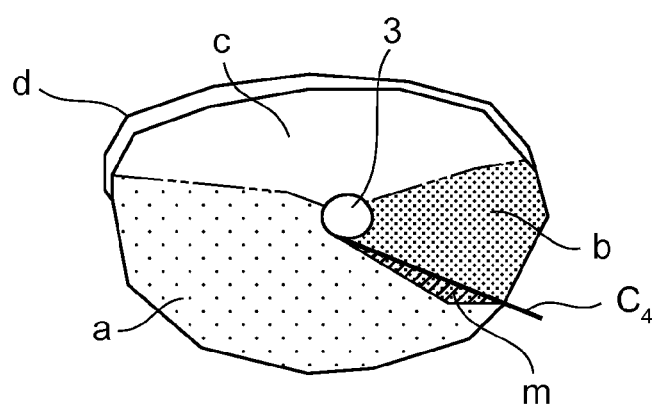
FIG. 17B is an explanatory view showing a poor cutting line in the meat cutting step (1)
Figure 17C:
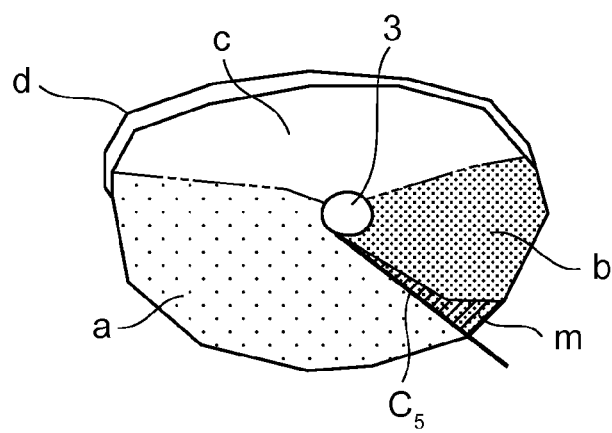
FIG. 17C is an explanatory view showing another poor cutting line in the meat cutting step (1)

Each of FIGS. 17A to 17C is a view indicative of the quality of the cutting line. A meat cutting line $C_3$ shown in FIG. 17A is a cutting line along the fascia e, and allows excellent meat cutting that does not damage the fascia e. A cutting line $C_4$ shown in FIG. 17B results in poor meat cutting that damages the fascia e on the side of the round tip and generates wasted meat m of the round tip b. A cutting line $C_5$ shown in FIG. 17C results in poor meat cutting that damages the fascia e on the side of the top round, generates the wasted meat m of the top round a, and cannot cut the thigh periosteum so that the thigh periosteum remains on the thigh bone and the yield of meat is deteriorated.

Figure 14:
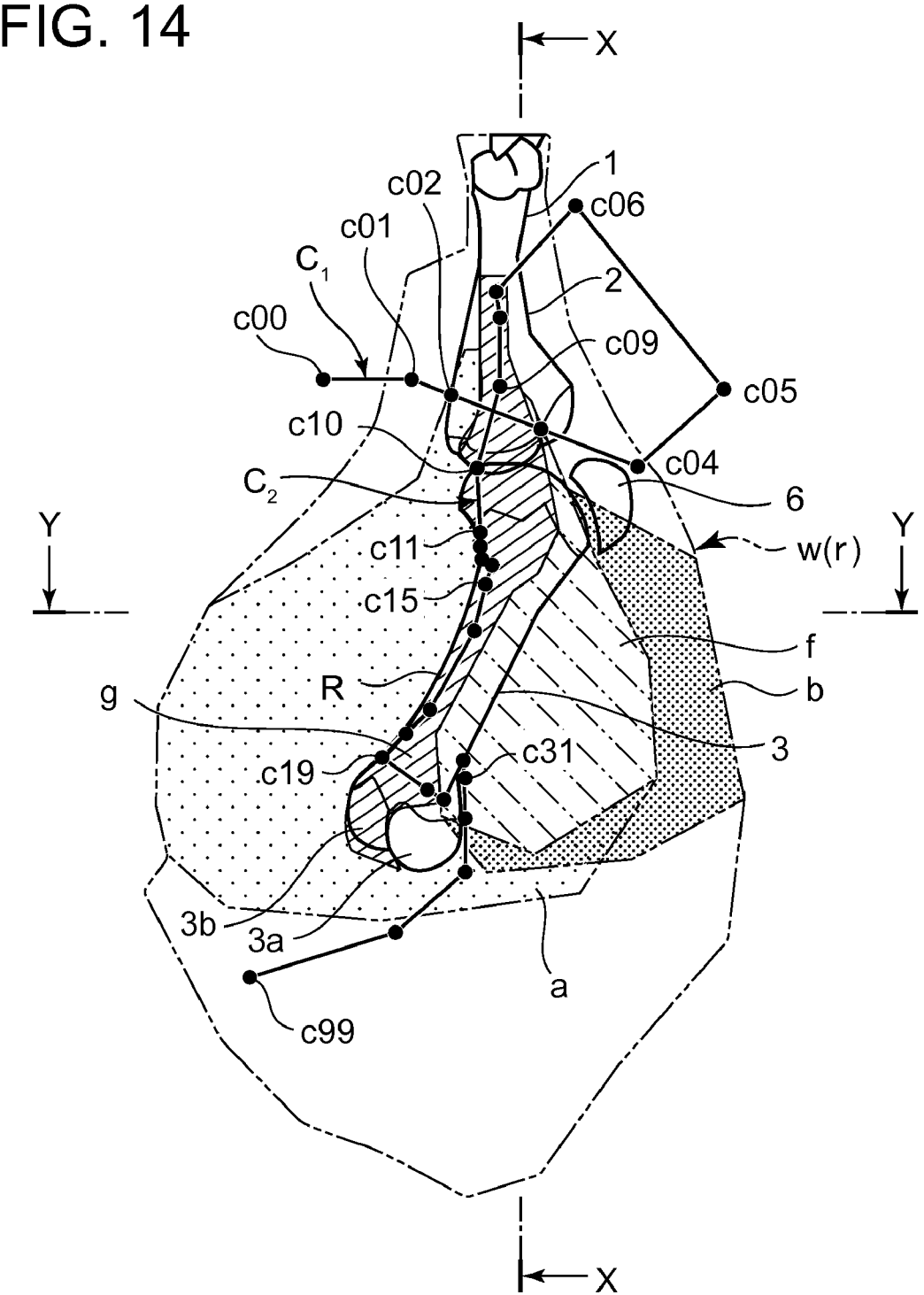
FIG. 14 is an explanatory view showing the operation course of the cutting blade in a meat cutting step (1) in the first embodiment.
Figure 15:
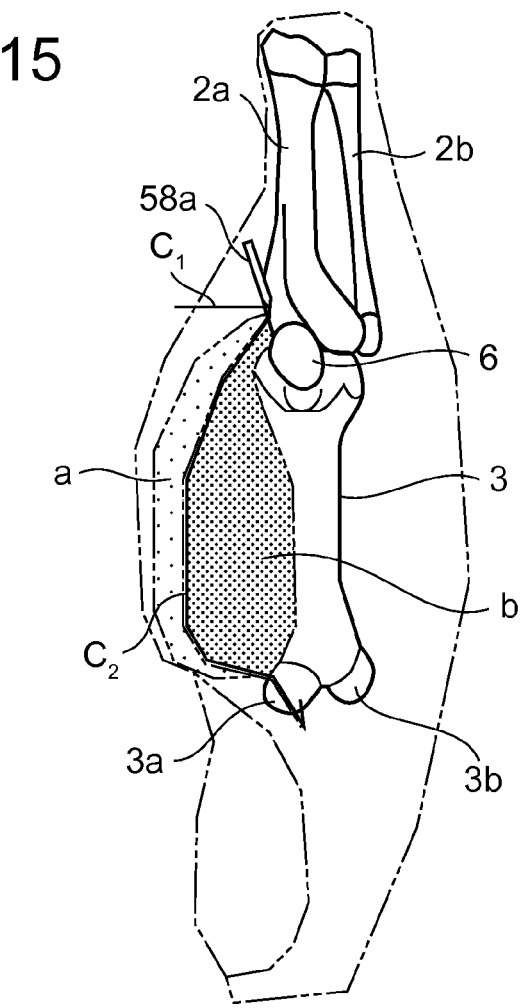
FIG. 15 is a view taken along arrows X-X of FIG. 14.
Figure 16:
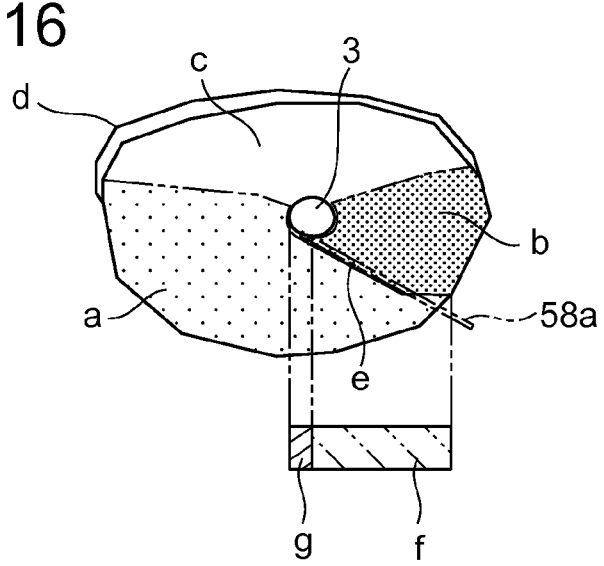
FIG. 16 is a view taken along arrows Y-Y of FIG. 14.

As shown in FIGS. 14 to 16, the top round a is positioned so as to hang over the round tip b. The boundary between the top round a and the round tip b is constituted by a three-dimensional curved plane so that, in order to make a cut along the fascia e using a straight knife-shaped cutting blade, it is necessary to initially stick the cutting blade into the fascia e from the lower part of the lower leg bone 2. That is, making a cut along the cutting line $C_1$ allows the knife-shaped cutting blade to smoothly enter a part between the fascia e and the top round a when a cut along the cutting line $C_2$ is made afterward.

As shown in FIGS. 14 and 15, along the cutting line $C_1$, the cutting blade 58a reaches a position where only the top round a can be cut and the round tip b cannot be cut and, along the cutting line $C_2$, the cutting blade 58a enters a part inside the top round a, and can cut the meat part as if the cutting blade 58a slides on the fascia e on the side of the round tip b. When the cutting line $C_1$ is shifted upward or downward, during the cutting along the cutting line $C_2$, it becomes difficult for the cutting blade to enter onto the fascia e. In the present embodiment, since it is possible to accurately grasp the shape and the position of the bone of the knee joint 5 by performing the X-ray image analysis of the work w to accurately position the operation course of the cutting blade 58a in correspondence to the shape and the position thereof, it is possible to accurately position the cutting line $C_1$. As a result, the meat cutting along the cutting line $C_3$ shown in FIG. 17A is allowed. Consequently, it is possible to improve the yield without damaging the top round a or the round tip b.

Figure 18:
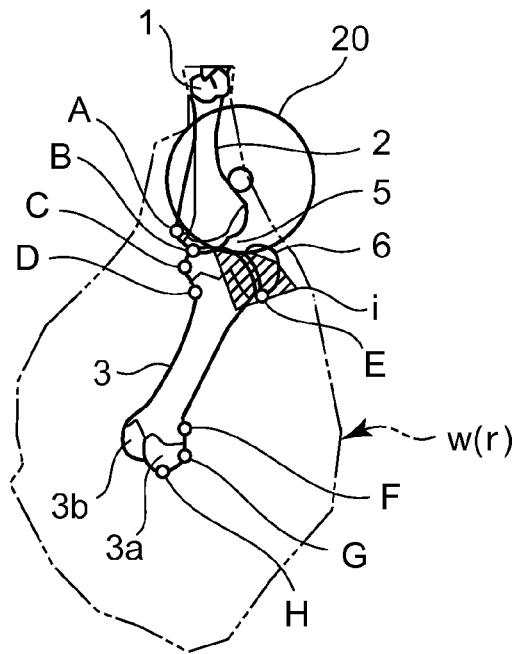
FIG. 18 is an explanatory view showing a kneepan cutting step in the first embodiment.
Figure 19:
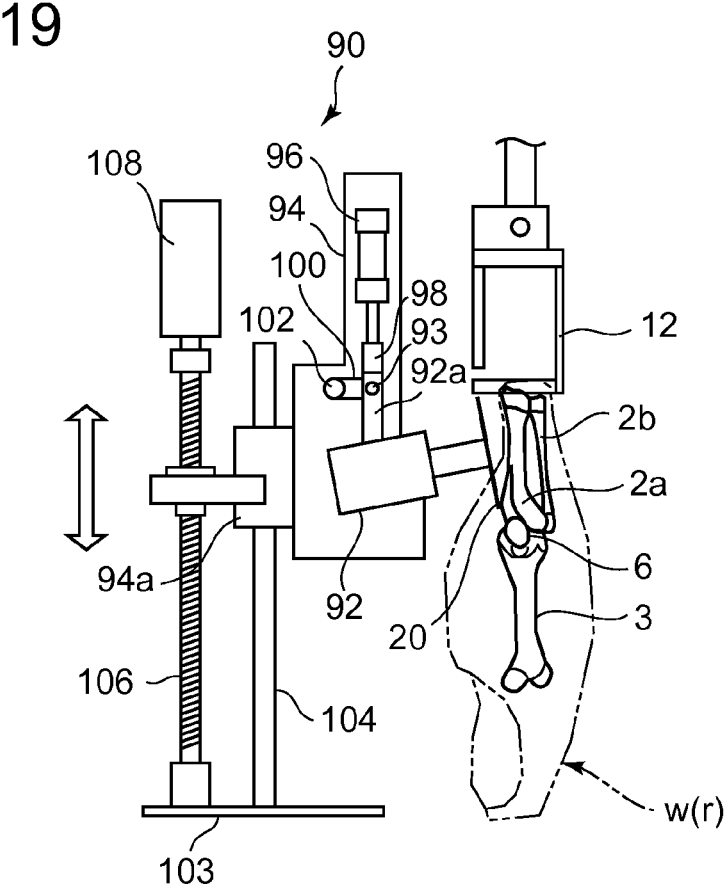
FIG. 19 is a front view of a cutting blade drive device in the kneepan cutting step.
Figure 20:
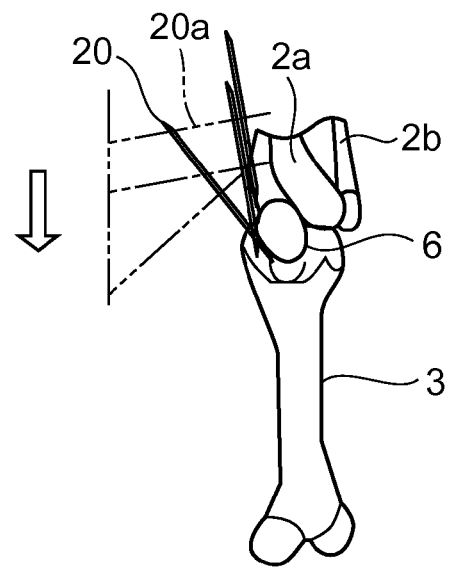
FIG. 20 is an enlarged view showing the operation of the cutting blade in the kneepan cutting step.

Next, a description is given of the kneepan cutting step of the present embodiment by taking the right-leg work w(r) as an example on the basis of FIGS. 18 to 20. The kneepan cutting step is a step of cutting body tissues such as a muscle and a tendon adhering to the side surface of the kneepan 6 by the rotating circular blade 20. In FIG. 18, the rotating circular blade 20 disposed in a vertical direction is caused to descend to form a cut surface i along the side surface of the kneepan 6.

FIG. 19 shows a drive device 90 of the rotating circular blade 20. A drive motor of the rotating circular blade 20 is contained in a motor casing 92. An air cylinder 96 is fixed to a platform 94 in a vertical direction. A frame 92a of the motor casing 92 is connected to an arm 100 at a predetermined angle with respect to the arm 100, and the connection part between the frame 92a and the arm 100 and a piston rod 98 of the air cylinder 96 are rotatably connected to a shaft 93. The other end of the arm 100 is rotatably attached to a support shaft 102 attached to the platform 94.

With this arrangement, as shown in FIG. 20, an axis 20a of the motor casing 92 and the rotating circular blade 20 is tilted in accordance with the vertical movement of the piston rod 98, and the angle of the rotating circular blade 20 can be changed. A boss part 94a of the platform 94 is guided by a guide bar 104 provided to vertically stand on a base 103. A screw rod 106 is provided to stand adjacent to the guide bar 104, and the screw rod 106 is rotationally driven by a drive motor 108. The platform 94 is moved up and down by the rotation of the screw rod 106.

In the structure described above, as shown in FIG. 20, it becomes possible to operate the rotating circular blade 20 along the side surface of the curved kneepan 6 while the rotating circular blade 20 is caused to descend. Consequently, it is possible to cut the body tissues adhering to the side surface of the kneepan 6 to improve the yield of meat. In addition, as shown in FIG. 18, among the comparison reference points A to H, the comparison reference point B is set at the knee joint 5 and the cutting start height of the cut surface i is set to the same height of that of the comparison reference point B, whereby it is possible to accurately position the cutting start height of the cut surface i. In addition, the comparison reference point E is set at the lower end of the kneepan 6 and the cutting end height of the cut surface i is set to the same height as that of the comparison reference point E, whereby it is possible to accurately position the cutting end height of the cut surface i.

Figure 21:
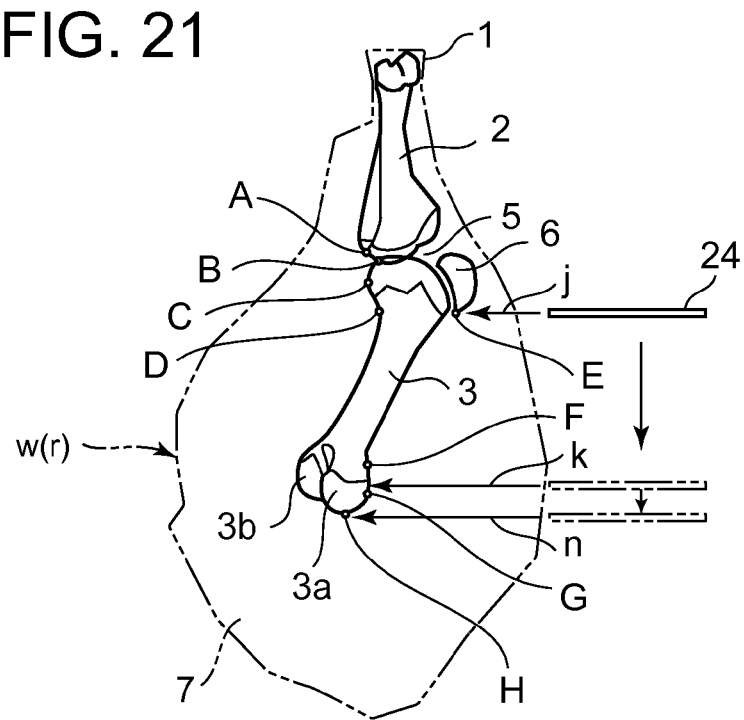
FIG. 21 is an explanatory view of a step of separating meat from a thigh bone in the first embodiment.

Next, a description is given of a meat separation step in the thigh bone 3 of the present embodiment on the basis of FIG. 21. In the meat separation step, a rotating circular blade 24 disposed in the horizontal direction is used. At positions j, k, and n, the rotating circular blade 24 is moved in the horizontal direction to be close to the work w (r) to cut body tissues adhered to the lower end part of the kneepan 6 and the surface of the thigh bone 3. By simultaneously performing the cutting operation, and pulling up of the clamping device 12 and pressing of the meat part by the separator 22 as shown in FIG. 2, the meat part 7 is separated from the thigh bone 3.

The cutting position j is positioned at the lower end of the kneepan 6, and corresponds to the comparison reference point E. At the cutting position J, the body tissues adhered to the lower end of the kneepan 6 are cut by the rotating circular blade 24. The cutting position k is positioned at the condyle of the thigh bone, and the cutting position n is positioned at the lower end of the condyle of the thigh bone. While the meat part adhering to the thigh bone 3 is pressed and torn by the separator 22, the body tissues on the surface of the thigh bone are cut at the cutting position k, and the meat part is separated from the thigh bone 3 at the cutting position n. In the present embodiment, the comparison reference point E and the cutting position k are set at the same height and the comparison reference point H and the cutting position n are set at the same height, and hence it is possible to precisely position the rotating circular blade 20 at the cutting positions j, k, and n. As a result, it is possible to efficiently perform the meat separation step of the thigh bone 3, and also improve the yield of meat.

According to the present embodiment, the comparison reference points A to H are set at characteristic parts of the bones, each work w is subjected to the X-ray image analysis, the positional displacement amounts between the two-dimensional position coordinates of the comparison reference points $A_0$ to $H_0$ corresponding to the target operation course of the cutting blade and the two-dimensional position coordinates of the comparison reference points A to H of the work w obtained by the X-ray image analysis are determined, the three-dimensional position coordinates of the target operation course are corrected correspondingly to the positional displacement amounts, and the cutting blade is operated on the corrected operation course, and hence it is possible to operate the cutting blade on the precise operation course along the surfaces of the bones for each work.

As a result, it is possible to prevent the cutting blade from cutting into the bone, reduce the damage to the cutting blade to maintain high operation efficiency, and also improve the yield of meat. In addition, it is possible to avert cutting of the bone by the cutting blade, prevent a bone fragment from mixing into the meat, and also avoid the generation of the excessive load in the cutting blade, and hence it is possible to reduce the capacity and power of the drive device of the cutting blade.

Further, even when the work w is clamped at the abnormal position relative to the clamping device 12 so that a difference is generated between the two-dimensional position coordinates of the bones of the work w obtained by the X-ray image analysis and the height of the work w during the meat cutting in the subsequent step, the difference is detected in advance and the two-dimensional position coordinates obtained by the X-ray image analysis are corrected to the normal position during the meat cutting, and hence it is possible to avert the application of the excessive load to the cutting blade during the meat cutting.

Furthermore, in the meat cutting steps (1) to (3), in addition to the acquisition of the position information by the X-ray image analysis of the work w, the torque value applied to the cutting blade is measured and the operation of the cutting blade is changed such that the torque value falls within the set range relative to the target reaction force, and hence it is possible to further precisely operate the cutting blade along the surface of the bone. As a result, it is possible to further improve the yield of meat, avert the application of the excessive load to the cutting blade, and prevent the damage to the cutting blade and cutting of the bone by the cutting blade.

Moreover, the check points are set at positions where the cutting blade tends to cut into the bone on the operation course of the cutting blade, i.e., the knee joint 5 and the condyle of the thigh bone, the torque value applied to the cutting blade is monitored from the region on the upstream side of the check point, and the torque value is thereby controlled so as not to be excessively large, and hence it is possible to prevent the cutting blade from cutting into the bone at the check point beforehand.

Additionally, the torque value applied to the cutting blade during the no-load operation is stored in the storage unit 62 and, by comparing the torque value and the torque value applied to the cutting blade during the meat cutting step, it is possible to speedily detect the damage to the cutting blade. Subsequently, it is possible to speedily halt the operation of the automatic deboning apparatus 10 to speedily perform the subsequent process.

In addition, in the meat cutting step (1), it is possible to accurately grasp the shape and position of the bone of the work w by the X-ray image analysis, and hence it is possible to accurately position the cutting lines $C_1$ and $C_2$. As a result, it is possible to precisely cut the part between the top round a and the round tip b without damaging the fascia e to eliminate the occurrence of the wasted meat. In the kneepan cutting step, it is possible to accurately position the cutting start point and the cutting end point of the cut surface i on the basis of the set comparison reference points B and E. As a result, it is possible to improve the yield of meat and also improve the operation efficiency of the automatic deboning apparatus 10. Further, in the meat separation step of the thigh bone, it is possible to precisely position the cutting position j, k, and n of the rotating circular blade 24 on the basis of the set comparison reference points E to H, and hence it is possible to improve the yield of meat and also improve the operation efficiency of the automatic deboning apparatus 10.

FIG. 22A shows the amount of remaining meat on the work w after the deboning process steps according to the present embodiment, while FIG. 22B shows the amount of remaining meat on the work w, which has not been subjected to the W-ray image analysis, after the deboning process disclosed in Patent Document 1 or 2. From these drawings, it can be seen that the present embodiment can reduce more amount of remaining meat than the conventional method by 10 g or more.

Figure 23C:
FIG. 23C is a view showing a state of remaining meat on the work in a conventional deboning process method.

Further, the deboning process according to the present embodiment and the deboning process disclosed in Patent Document 1 or 2 were actually performed and the state of remaining meat on the work w in each process was observed. Each of FIGS. 23A and 23B shows the result of meat cutting below the knee joint according to the present embodiment, while FIG. 23C shows the result of meat cutting of the knee joint part by the conventional deboning process without performing the X-ray image analysis. In FIG. 23B, points A, B, C, and D correspond to the comparison reference points A, B, C, and D in FIG. 5. In FIG. 23C, M indicates a bone cut part where a part of the lower leg bone 2 is cut by the cutting blade, and N indicates a remaining meat part where the remaining meat adheres to the lower leg bone 2. It can be seen that the meat part is cut along the bone surface more precisely in the present embodiment.

Figure 24A:
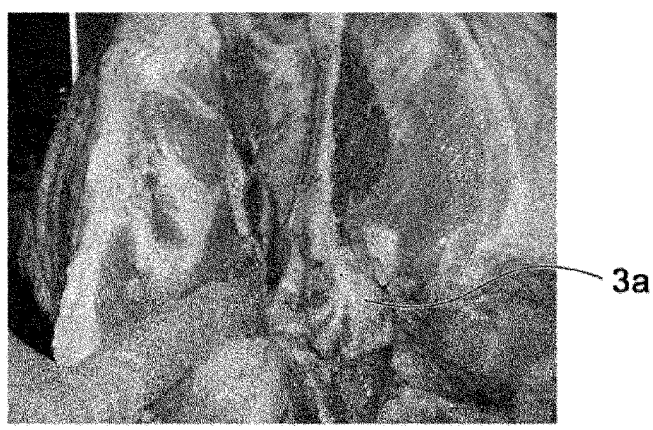
FIG. 24A is a view showing a result of meat cutting of the thigh bone of the work in the first embodiment.
Figure 24B:
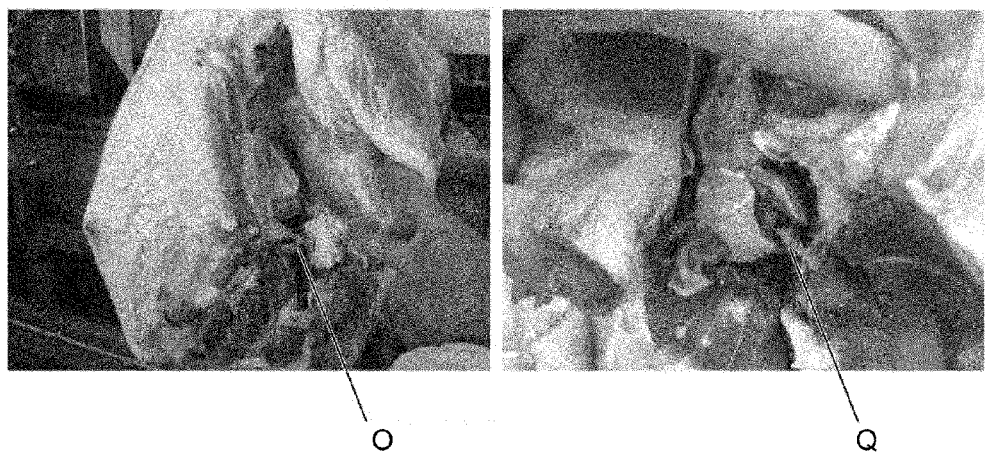
FIG. 24B is a view of a result of meat cutting of the thigh bone of the work in the conventional deboning process method.

FIG. 24A shows the result of meat cutting of the thigh bone part according to the present embodiment, while FIG. 24B shows the result of meat cutting of the thigh bone part by the conventional deboning process. In FIG. 24A, cutting of the periosteum of the thigh bone and meat cutting of the periphery of the thigh ball 3a are stably performed and the amount of remaining meat is reduced. In contrast to this, in FIG. 24B, at parts O and Q, the condyle of the thigh bone is broken.

Figure 25A:
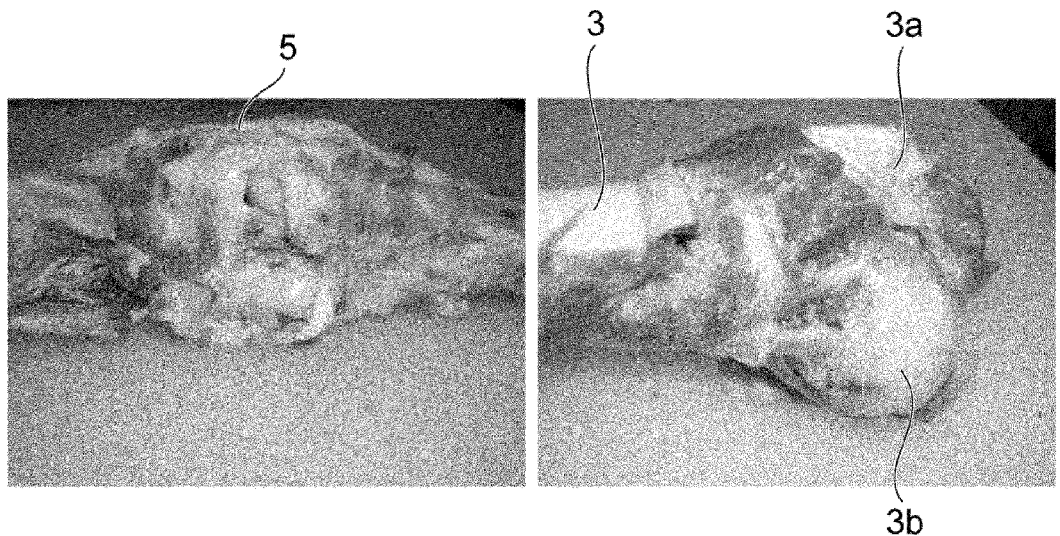
FIG. 25A is a view showing a state of remaining meat on the work after meat separation in the first embodiment.
Figure 25B:
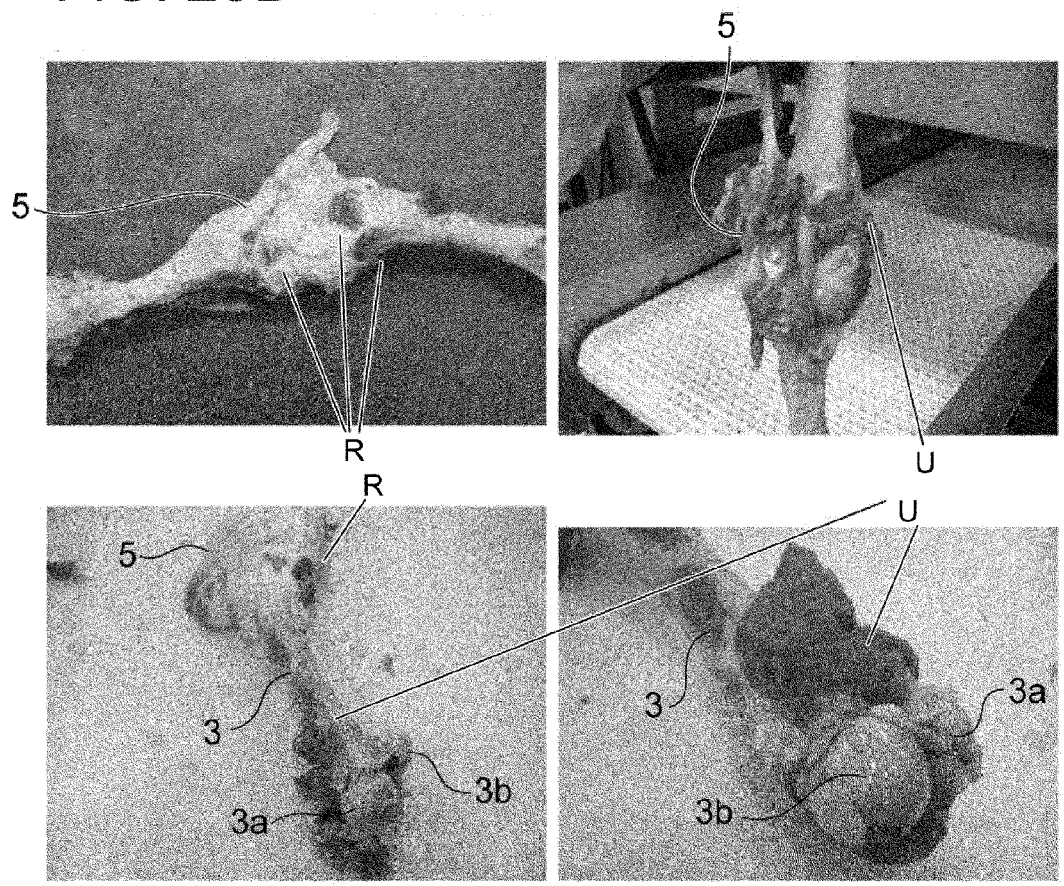
FIG. 25B is a view showing a state of remaining meat on the work after meat separation in the conventional deboning process method.

FIG. 25A shows the state of remaining meat on the work w after meat separation according to the present embodiment, while FIG. 25B shows the state of remaining meat after meat separation by the conventional deboning process. FIG. 25A shows the state of remaining meat on each of the knee joint 5, the thigh bone 3, and the thigh ball 3a. The amount of remaining meat is less than 40 g and, in FIG. 25B, R indicates bone cut parts, and the surface of the bone is cut in places at the parts R. In addition, U indicates remaining meat parts, and the remaining meat adheres to the bone at the parts U.

Figure 26:
FIG. 26 is a view showing a result of meat cutting in the meat cutting step (1) of the first embodiment.
Figure 27:
FIG. 27 is a view showing a comparative example of the result of meat cutting in the meat cutting step (1)
Figure 28:
FIG. 28 is a view showing another comparative example of the result of meat cutting in the meat cutting step (1)

Each of FIGS. 26 to 28 shows the state of the cut surface of the fascia e at the boundary between the top round a and the round tip b in the meat cutting step (1) of the present embodiment. FIG. 26 shows an excellent cut surface obtained by the present embodiment. The fascia e on the side of the round tip is not damaged and is left in an excellent state. In the drawing, the reference numeral 3 denotes the thigh bone. FIGS. 27 and 28 are given as comparative examples, and are examples of poor cutting in which the X-ray image analysis of the work w is not performed. In FIG. 27, the fascia on the side of the round tip b is cut and the lean is exposed. In addition, since a part of the round tip adheres onto the top round a, the part of the round tip has to be removed when the fascia on the side of the top round is removed so that the part of the round tip becomes wasted meat.

In FIG. 28, the fascia of the top round a is cut and the lean is exposed. Since a part of the top round adheres onto the round tip b, the part of the top round has to be removed when the fascia of the round tip is removed so that the part of the top round becomes wasted meat. In addition, at a position indicated by V, the periosteum of the thigh bone 3 is not cut so that the yield of meat is deteriorated.

Second Embodiment

Figure 30:
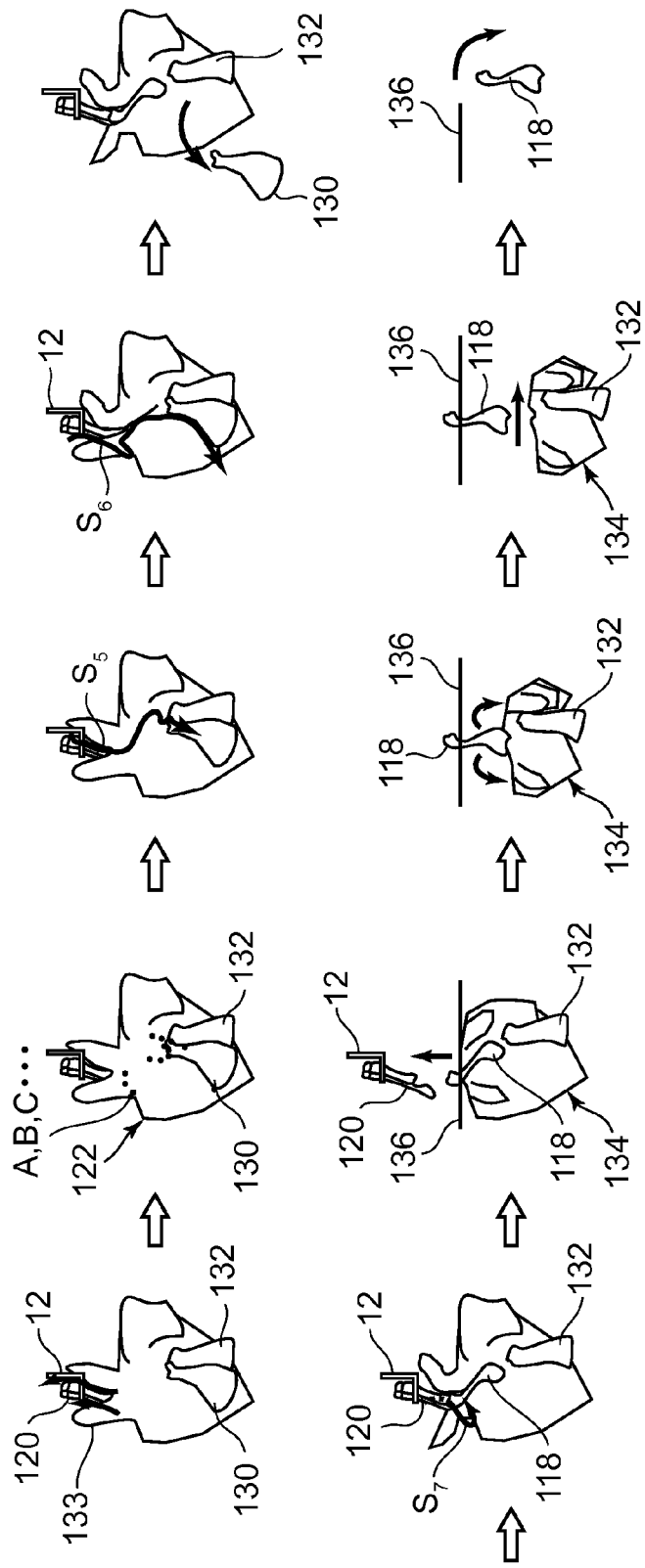
FIG. 30 is a step diagram of an automatic deboning deboning process of the second embodiment.

Next, a description is given of a second embodiment in which the present invention is applied to the deboning step of a pig arm part on the basis of FIGS. 29 and 30. FIG. 29 shows preliminary process steps manually performed by an operator, and FIG. 30 shows deboning steps by an automatic deboning apparatus. In FIG. 29, the skeleton of an arm/shoulder part 110 after a dressed carcass is roughly divided is constituted by a backbone 112, a rib 114, a spur 116, a humerus 118, and a forearm bone 120. The arm/shoulder part 110 is divided along a cutting line $C_6$ into an arm part 122 and a boston butt part 124. The boston butt part 124 divided from the arm part 122 is subjected to another deboning step. As for the arm part 122, a fat layer 126 in a neck part of the arm part 122 is removed in the next step, and then a rib meat 128 on the boundary side of the shoulder part is turned over. Next, an upper side meat 132 on a scapula 130 is torn.

Subsequently, as shown in FIG. 30, a shank meat 133 is cut open to expose the forearm bone 120, and an ankle is suspended from the clamping device 12. From this point onward, automatic deboning steps by the automatic deboning apparatus are started. The automatic deboning apparatus of the present embodiment has the structure similar to that of the first embodiment. First, a plurality of comparison reference points A, B, C, . . . are set at positions that can be easily located on the outlines of the bones. In addition, a storage unit of a controller of the automatic deboning apparatus stores three-dimensional position coordinates of a target operation course of the cutting blade in each of a meat cutting step and a meat separation step, and data on a normal torque value applied to a cutting blade during the cutting operation. X-ray irradiation and X-ray image processing of the arm part 122 are performed in the next step, and the target operation course is corrected on the basis of two-dimensional position coordinates obtained by the X-ray image processing.

Subsequently, meat cutting shown by a meat cutting line $S_5$ is performed in a meat cutting step (1), then meat cutting shown by a meat cutting line $S_6$ is performed in a meat cutting step (2) and, thereafter, the scapula 130 is removed. In each of the meat cutting steps (1) and (2), during the cutting operation, the torque value applied to the cutting blade and the data on the normal torque value are compared with each other, and the operation course of the cutting blade is controlled such that an excessive load is not applied to the cutting blade.

Then, meat cutting of the forearm bone part shown by a meat cutting line $S_7$ is performed, and the forearm bone 120 separated from a meat part 134 and the humerus 118 to which the meat part 134 still adheres are separated from each other. The humerus 118 is suspended from a rail 136 disposed in a horizontal direction. Thereafter, in a state where the humerus 118 is suspended from the rail 136, the step of separating the meat part 134 from the humerus 118 is performed, and the humerus 118 remaining on the rail 136 is eventually discharged.

By the above-described structure and performing the above-described operational procedures, in the present embodiment as well, it is possible to obtain the operation and effect similar to those of the first embodiment.

INDUSTRIAL APPLICABILITY

According to the present invention, in an automatic deboning step of an arm part or a thigh part of a carcass, it is possible to allow precise meat cutting along a bone surface, improve yield, and prevent an excessive load in a cutting blade.

The invention claimed is:

1. A deboning method for meat with bone using an X-ray in which, in a state where an arm part or a thigh part of a carcass is suspended via an ankle, a deboning process of the arm part or the thigh part is performed by using a multi-axis articulated arm provided with a cutting blade that operates based on a predetermined operation course, the method comprising:
a preliminary step of setting a comparison reference point on an outline of a bone of the arm part or the thigh part, and also presetting three-dimensional position coordinates of a target operation course of the cutting blade and two-dimensional position coordinates of the comparison reference point corresponding to the three-dimensional position coordinates of the target operation course;
an X-ray image analysis step of irradiating the X-ray to each arm part or each thigh part to obtain two-dimensional position coordinates of the outline of the bone of the arm part or the thigh part by analyzing a transmitted X-ray image;
an operation course correction step of determining a positional displacement amount between the two-dimensional position coordinates of the comparison reference point corresponding to the target operation course and the two-dimensional position coordinates of the comparison reference point obtained in the X-ray image analysis step to determine a corrected operation course obtained by correcting the target operation course correspondingly to the positional displacement amount; and
a cutting blade operation step of operating the cutting blade on the corrected operation course determined in the operation course correction step to perform meat cutting or meat separation of the arm part or the thigh part.

2. The deboning method for meat with bone using an X-ray according to claim 1, further comprising:
an ankle measurement step of determining an ankle bone diameter $W_1$ immediately below a clamping position of an ankle of the arm part or the thigh part and an ankle bone diameter $W_2$ immediately above the clamping position thereof from the two-dimensional position coordinates of the outline of the bone of the arm part or the thigh part obtained in the X-ray image analysis step;
a work length measurement step of determining a length $L_1$ from the clamping position to a joint and a length $L_2$ from the joint to an end of a condyle from the two-dimensional position coordinates obtained in the X-ray image analysis step when the ankle bone diameter $W_1$ is larger than the ankle bone diameter $W_2$ in the ankle measurement step; and an image information correction step of changing, when a ratio between the length $L_1$ and the length $L_2$ does not fall within a normal range, the ratio between the lengths to a normal value to correct the two-dimensional position coordinates obtained in the X-ray image analysis step.

3. The deboning method for meat with bone using an X-ray according to claim 1, wherein in the preliminary step, a reaction force applied to the cutting blade when the cutting blade operates on the target operation course is measured in advance and target reaction force data is stored, in the cutting blade operation step, the meat cutting in which a cut is made in a longitudinal direction along a surface of the bone of the arm part or the thigh part is performed and a reaction force applied to the cutting blade during a cutting operation is measured, and when a difference between the measured reaction force and the target reaction force data is out of a set range, the corrected operation course corrected in the operation course correction step is changed such that the difference falls within the set range.

4. The deboning method for meat with bone using an X-ray according to claim 3, wherein the reaction force applied to the cutting blade during the cutting operation is determined by subtracting a reaction force applied to the cutting blade during a no-load operation from a reaction force applied to the cutting blade during a loaded operation.

5. The deboning method for meat with bone using an X-ray according to claim 3, wherein a check point is set at a position where an excessive load tends to be generated in the cutting blade on the operation course of the cutting blade, the reaction force applied to the cutting blade during the cutting operation is measured in a region on an upstream side of the check point, and, when the difference between the measured reaction force and the target reaction force data is out of the set range, the corrected operation course from a point, where the reaction force is measured, to the check point is changed such that the difference falls within the set range.

6. The deboning method for meat with bone using an X-ray according to claim 3, wherein in the preliminary step, a reaction force applied to the cutting blade during a no-load operation is measured in advance and no-load reaction force data is stored, the deboning method further comprising:

an operation halt step of comparing the reaction force applied to the cutting blade during the cutting operation of the cutting blade and the no-load reaction force data and, when a difference between the reaction force and the no-load reaction force data is out of a set range, determining that the cutting blade is damaged to halt an operation.

7. A deboning apparatus for meat with bone using an X-ray that comprises a multi-axis articulated arm provided with a cutting blade that operates based on a predetermined operation course and a device that suspends and transports an arm part or a thigh part of a carcass, and performs a deboning process in a state where the arm part or the thigh part is suspended, the apparatus comprising:

an X-ray irradiation unit that is disposed on an upstream side of the multi-axis articulated arm in a direction of transport of the arm part or the thigh part and irradiates the X-ray to the suspended arm part or the suspended thigh part;

an X-ray entrance unit into which the X-ray transmitted through the arm part or the thigh part enters;

an image analysis process unit that analyzes a transmitted X-ray image having entered the X-ray entrance unit to obtain two-dimensional position information on an outline of a bone; and a controller that controls an operation of the cutting blade, the controller comprising:

a comparison reference point setting unit that sets a comparison reference point on the outline of the bone of the arm part or the thigh part;

a storage unit that stores three-dimensional position coordinates of a target operation course of the cutting blade and two-dimensional position coordinates of the comparison reference point corresponding to the three-dimensional position coordinates of the target operation course; and an operation course correction unit that determines a positional displacement amount between the two-dimensional position coordinates of the comparison reference point corresponding to the target operation course and two-dimensional position coordinates of the comparison reference point obtained in the image analysis process unit to determine a corrected operation course obtained by correcting the target operation course correspondingly to the positional displacement amount, wherein the cutting blade is operated on the corrected operation course determined in the operation course correction unit.

8. The deboning apparatus for meat with bone according to claim 7, wherein the controller further comprises:

an ankle measurement unit that determines an ankle bone diameter $W_1$ immediately below a clamping position of the suspension and transport device and an ankle bone diameter $W_2$ immediately above the clamping position thereof from the two-dimensional position coordinates of the outline of the bone obtained in the image analysis process unit;

a work length measurement unit that determines a length $L_1$ from the clamping position to a joint and a length $L_2$ from the joint to an end of a condyle from the two-dimensional position coordinates of the bone obtained in the image analysis process unit when the ankle bone diameter $W_1$ is larger than the ankle bone diameter $W_2$ in the ankle measurement unit; and an image information correction unit that changes, when a ratio between the length $L_1$ and the length $L_2$ is out of a normal range, the ratio between the lengths to a normal value to correct the two-dimensional position information on the bone obtained in the image analysis process unit.

9. The deboning apparatus for meat with bone using an X-ray according to claim 7, further comprising:

a reaction force measurement device that measures a reaction force applied to the cutting blade, wherein the storage unit of the controller stores target reaction force data obtained by measuring a reaction force applied to the cutting blade when the cutting blade operates on the target operation course, and the controller further comprises an operation course change unit that changes, when a difference between a reaction force measured by the reaction force measurement device during a cutting operation of the cutting blade and the target reaction force data is out of a set range, the operation course of the cutting blade such that the measured reaction force falls within the set range.

10. The deboning apparatus for meat with bone using an X-ray according to claim 9, wherein
- the controller sets a check point at a position where an excessive load tends to be generated in the cutting blade on the operation course of the cutting blade,
- the reaction force measurement device measures the reaction force applied to the cutting blade during the cutting operation in a region on an upstream side of the check point, and
- when the difference between the measured reaction force and the target reaction force data is out of the set range, the operation course change unit changes the corrected operation course from a point, where the reaction force is measured, to the check point such that the difference falls within the set range.

11. The deboning apparatus for meat with bone using an X-ray according to claim 9, wherein
- the controller stores measurement data on a reaction force applied to the cutting blade during a no-load operation in the storage unit, and further comprises a determination unit that compares the reaction force applied to the cutting blade during the cutting operation of the cutting blade and the stored no-load reaction force data and, when a difference between the reaction force and the stored no-load reaction force data is out of a set range, determines that the cutting blade is damaged to issue an operation halt instruction.

* * * * *